(12) United States Patent
Kishine et al.

(10) Patent No.: US 12,096,135 B2
(45) Date of Patent: Sep. 17, 2024

(54) IMAGING APPARATUS AND METHOD

(71) Applicant: FUJIFILM Corporation, Tokyo (JP)

(72) Inventors: Yasunobu Kishine, Saitama (JP); Atsushi Kawanago, Saitama (JP); Kazuyoshi Okada, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 17/884,537

(22) Filed: Aug. 9, 2022

(65) Prior Publication Data

US 2022/0385863 A1 Dec. 1, 2022

Related U.S. Application Data

(63) Continuation of application No. PCT/JP2021/006660, filed on Feb. 22, 2021.

(30) Foreign Application Priority Data

Feb. 28, 2020 (JP) ................................ 2020-033962

(51) Int. Cl.
*H04N 25/13* (2023.01)
*G02B 5/20* (2006.01)
(Continued)

(52) U.S. Cl.
CPC ........... *H04N 25/134* (2023.01); *G02B 5/201* (2013.01); *G02B 5/3025* (2013.01); *H04N 25/60* (2023.01); *H04N 25/702* (2023.01)

(58) Field of Classification Search
CPC .... H04N 25/134; H04N 25/60; H04N 25/702; H04N 23/12; H04N 23/125; H04N 23/00;
(Continued)

(56) References Cited

U.S. PATENT DOCUMENTS

| | | | |
|---|---|---|---|
| 2012/0105598 | A1 | 5/2012 | Hiramoto et al. |
| 2015/0130962 | A1 | 5/2015 | Hiramoto et al. |
| 2018/0139378 | A1 | 5/2018 | Moriuchi et al. |

FOREIGN PATENT DOCUMENTS

| | | |
|---|---|---|
| CN | 102474646 | 5/2012 |
| CN | 108076264 | 5/2018 |

(Continued)

OTHER PUBLICATIONS

"Office Action of China Counterpart Application", issued on Dec. 26, 2023, with English translation thereof, p. 1-p. 12.

(Continued)

*Primary Examiner* — Twyler L Haskins
*Assistant Examiner* — Angel L Garces-Rivera
(74) *Attorney, Agent, or Firm* — JCIPRNET

(57) ABSTRACT

Provided are an imaging apparatus and a method capable of capturing a high-quality multi spectral image. The imaging apparatus includes: an optical system that has three or more aperture regions at a pupil position or near the pupil position, each of the aperture regions being provided with a different combination of a polarizing filter and a bandpass filter such that the aperture region transmits light having a combination of a different polarization angle and a different wavelength range; an image sensor in which three or more types of pixels that receive light having different polarization angles are arranged two-dimensionally; and a processor that performs interference removal processing on a signal output from the image sensor and generates an image signal for each of the aperture regions. In a case where the optical system has three or more types of the polarizing filters and the polarizing filters are arranged in an order of the polarization angles, at least one of differences in the polarization angles of the adjacent polarizing filters is different from the others.

16 Claims, 27 Drawing Sheets

(51) Int. Cl.
*G02B 5/30* (2006.01)
*H04N 25/60* (2023.01)
*H04N 25/702* (2023.01)

(58) Field of Classification Search
CPC .... G02B 5/201; G02B 5/3025; G02B 26/008; G03B 7/00; G03B 11/00
See application file for complete search history.

(56) References Cited

FOREIGN PATENT DOCUMENTS

| | | |
|---|---|---|
| JP | 2013102322 | 5/2013 |
| JP | 2018036314 | 3/2018 |
| JP | 2018077190 | 5/2018 |
| WO | 2014020791 | 2/2014 |

OTHER PUBLICATIONS

"International Search Report (Form PCT/ISA/210) of PCT/JP2021/006660," mailed on Apr. 20, 2021, with English translation thereof, pp. 1-5.

"Written Opinion of the International Searching Authority (Form PCT/ISA/237) of PCT/JP2021/006660," mailed on Apr. 20, 2021, with English translation thereof, pp. 1-8.

| | FIRST APERTURE REGION TRANSMISSION WAVELENGTH RANGE: $\lambda 1$ | SECOND APERTURE REGION TRANSMISSION WAVELENGTH RANGE: $\lambda 2$ | THIRD APERTURE REGION TRANSMISSION WAVELENGTH RANGE: $\lambda 3$ |
|---|---|---|---|
| SENSITIVITY | 0.5 | 1 | 0.2 |
| POLARIZATION ANGLE (°) | 0 | 60 | 120 |
| NOISE AMOUNT (PV) | 2.8 | 1.7 | 7.2 |

(B)

| | FIRST APERTURE REGION TRANSMISSION WAVELENGTH RANGE: $\lambda 1$ | SECOND APERTURE REGION TRANSMISSION WAVELENGTH RANGE: $\lambda 2$ | THIRD APERTURE REGION TRANSMISSION WAVELENGTH RANGE: $\lambda 3$ |
|---|---|---|---|
| SENSITIVITY | 0.5 | 1 | 0.2 |
| POLARIZATION ANGLE (°) | 30 | 60 | 120 |
| NOISE AMOUNT (PV) | 4.1 | 2.7 | 5.6 |

FIG. 18

| | CONDITIONS | | | | | | RESULTS | | | | | | |
|---|---|---|---|---|---|---|---|---|---|---|---|---|---|
| | FIRST APERTURE REGION λ1 | | SECOND APERTURE REGION λ2 | | THIRD APERTURE REGION λ3 | | NOISE STD | | | NUMBER OF CONDITIONS | NOISE PV | | |
| | SENSITIVITY | POLARIZATION ANGLE θ1 (°) | SENSITIVITY | POLARIZATION ANGLE θ2 (°) | SENSITIVITY | POLARIZATION ANGLE θ3 (°) | FIRST APERTURE REGION λ1 | SECOND APERTURE REGION λ2 | THIRD APERTURE REGION λ3 | | FIRST APERTURE REGION λ1 | SECOND APERTURE REGION λ2 | THIRD APERTURE REGION λ3 |
| A | 1 | 0 | 1 | 60 | 1 | 120 | 0.86 | 0.87 | 0.87 | 2.0 | 2.5 | 2.7 | 2.7 |
| B | 1 | 0 | 0.5 | 60 | 0.5 | 120 | 0.65 | 1.11 | 1.11 | 3.0 | 1.8 | 3.5 | 3.5 |
| C | 1 | 0 | 0.5 | 60 | 0.25 | 120 | 0.60 | 1.01 | 1.82 | 5.2 | 1.6 | 3.1 | 5.8 |
| D | 1 | 0 | 0.5 | 60 | 0.1 | 120 | 0.58 | 0.95 | 3.98 | 12.8 | 1.5 | 2.8 | 12.8 |

FIG. 19

| | CONDITIONS | | | | | | RESULTS | | | | | | |
|---|---|---|---|---|---|---|---|---|---|---|---|---|---|
| | FIRST APERTURE REGION λ1 | | SECOND APERTURE REGION λ2 | | THIRD APERTURE REGION λ3 | | NOISE STD | | | NUMBER OF CONDITIONS | NOISE PV | | |
| | SENSITIVITY | POLARIZATION ANGLE θ1 (°) | SENSITIVITY | POLARIZATION ANGLE θ2 (°) | SENSITIVITY | POLARIZATION ANGLE θ3 (°) | FIRST APERTURE REGION λ1 | SECOND APERTURE REGION λ2 | THIRD APERTURE REGION λ3 | | FIRST APERTURE REGION λ1 | SECOND APERTURE REGION λ2 | THIRD APERTURE REGION λ3 |
| C | 1 | 0 | 0.5 | 60 | 0.25 | 120 | 0.60 | 1.01 | 1.82 | 5.2 | 1.6 | 3.1 | 5.8 |
| C1 | 1 | 0 | 0.5 | 36.3 | 0.25 | 110.5 | 0.77 | | | 4.83 | 2.3 | 3.8 | 4.3 |
| C2 | 1 | 0 | 0.5 | 26.7 | 0.25 | 103.6 | 0.95 | 1.69 | 1.25 | | 3.0 | 4.6 | 3.7 |
| C3 | 1 | 0 | 0.5 | 32.2 | 0.25 | 102.0 | 0.81 | 1.52 | 1.28 | 4.97 | | | |

FIG. 23

| | CONDITIONS | | | | | | RESULTS | | | | | | |
|---|---|---|---|---|---|---|---|---|---|---|---|---|---|
| | FIRST APERTURE REGION λ1 | | SECOND APERTURE REGION λ2 | | THIRD APERTURE REGION λ3 | | NOISE STD | | | NUMBER OF CONDITIONS | NOISE PV | | |
| | SENSITIVITY | POLARIZATION ANGLE θ1(°) | SENSITIVITY | POLARIZATION ANGLE θ2(°) | SENSITIVITY | POLARIZATION ANGLE θ3(°) | FIRST APERTURE REGION λ1 | SECOND APERTURE REGION λ2 | THIRD APERTURE REGION λ3 | | FIRST APERTURE REGION λ1 | SECOND APERTURE REGION λ2 | THIRD APERTURE REGION λ3 |
| D | 1 | 0 | 0.5 | 60 | 0.1 | 120 | 0.58 | 0.95 | 3.98 | 12.8 | 1.5 | 2.8 | 12.8 |
| D1 | 1 | 0 | 0.5 | 21.8 | 0.1 | 99.4 | | | | 11.87 | 3.1 | 4.9 | 7.9 |
| D2 | 1 | 0 | 0.5 | 21.4 | 0.1 | 101.2 | 1.04 | 1.91 | 2.67 | | 3.2 | 5.0 | 7.9 |
| D3 | 1 | 0 | 0.5 | 26.6 | 0.1 | 102.5 | 0.89 | 1.61 | 2.68 | 11.87 | | | |

IMAGING APPARATUS AND METHOD

CROSS-REFERENCE TO RELATED APPLICATIONS

The present application is a Continuation of PCT International Application No. PCT/JP2021/006660 filed on Feb. 22, 2021 claiming priority under 35 U.S.C. § 119(a) to Japanese Patent Application No. 2020-033962 filed on Feb. 28, 2020. Each of the above applications is hereby expressly incorporated by reference, in its entirety, into the present application.

BACKGROUND OF THE INVENTION

1. Field of the Invention

The present invention relates to an imaging apparatus and method, and more particularly to an imaging apparatus and a method for capturing an image (multi spectral image) in a plurality of wavelength ranges.

2. Description of the Related Art

WO2014/020791A describes a technique for capturing an image (multispectral image) in three wavelength ranges at a time by using a polarizing color filter plate having three translucent regions and an imaging element provided with three polarizing filters.

SUMMARY OF THE INVENTION

One embodiment according to the technology of the present disclosure provides an imaging apparatus and a method capable of capturing a high-quality multispectral image.

(1) An imaging apparatus comprising: an optical system that has three or more aperture regions at a pupil position or near the pupil position, each of the aperture regions being provided with a different combination of a polarizing filter and a bandpass filter such that the aperture region transmits light having a combination of a different polarization angle and a different wavelength range; an image sensor in which three or more types of pixels that receive light having different polarization angles are arranged two-dimensionally; and a processor that performs interference removal processing on a signal output from the image sensor and generates an image signal for each of the aperture regions, in which, in a case where the optical system has three or more types of the polarizing filters and the polarizing filters are arranged in an order of the polarization angles, at least one of differences in the polarization angles of the adjacent polarizing filters is different from the others.

(2) The imaging apparatus according to (1), in which the polarization angle of each of the polarizing filters is set based on a sensitivity of the light transmitted through each of the aperture regions.

(3) The imaging apparatus according to (1) or (2), in which the polarization angle set for each of the polarizing filters is set to a polarization angle at which a difference in a noise amount of the image signal in each of the aperture regions is reduced as compared with a case where the differences are all equal.

(4) The imaging apparatus according to (1) or (2), in which the polarization angle set for each of the polarizing filters is set to a polarization angle at which a difference in a noise amount of the image signal in each of the aperture regions is minimized.

(5) The imaging apparatus according to (1) or (2), in which the polarization angle set for each of the polarizing filters is set to a polarization angle at which an amount of noise amplification due to the interference removal processing is reduced as compared with a case where the differences are all equal.

(6) The imaging apparatus according to (1) or (2), in which the polarization angle set for each of the polarizing filters is set to a polarization angle at which an amount of noise amplification due to the interference removal processing is minimized.

(7) The imaging apparatus according to (1) or (2), in which the polarization angle set for each of the polarizing filters is set to a polarization angle at which an amount of interference between the image signal in the aperture region having a relatively low sensitivity and the image signal in the other aperture region is reduced.

(8) The imaging apparatus according to (1) or (2), in which, in a case where the processor performs the interference removal processing based on an interference matrix, the polarization angle set for each of the polarizing filters is set to a polarization angle at which the number of conditions of the interference matrix is reduced as compared with a case where the differences are all equal.

(9) The imaging apparatus according to (1) or (2), in which, in a case where the processor performs the interference removal processing based on an interference matrix, the polarization angle set for each of the polarizing filters is set to a polarization angle at which the number of conditions of the interference matrix is minimized.

(10) The imaging apparatus according to any one of (1) to (9), in which the optical system has a replacement mechanism in which at least one of the bandpass filter or the polarizing filter is individually replaced.

(11) The imaging apparatus according to any one of (1) to (9), in which the optical system has a rotational structure in which at least one of the bandpass filter or the polarizing filter rotates.

(12) An imaging method comprising: using an optical system that has three or more aperture regions at a pupil position or near the pupil position, each of the aperture regions being provided with a different combination of a polarizing filter and a bandpass filter such that the aperture region transmits light having a combination of a different polarization angle and a different wavelength range, and an image sensor in which three or more types of pixels that receive light with different polarization angles are arranged two-dimensionally to perform interference removal processing on a signal output from the image sensor and generate an image signal for each of the aperture regions, in which, in a case where the optical system has three or more types of the polarizing filters and the polarizing filters are arranged in an order of the polarization angles, at least one of differences in the polarization angles of the adjacent polarizing filters is different from the others.

(13) The imaging method according to (12), in which the polarization angle of each of the polarizing filters is set based on a sensitivity of the light transmitted through each of the aperture regions.

(14) The imaging method according to (12) or (13), in which the polarization angle set for each of the polarizing filters is set to a polarization angle at which a difference in a noise amount of the image signal in each of the aperture regions is reduced as compared with a case where the differences are all equal.

(15) The imaging method according to (12) or (13), in which the polarization angle set for each of the polarizing filters is set to a polarization angle at which a difference in a noise amount of the image signal in each of the aperture regions is minimized.

(16) The imaging method according to (12) or (13), in which the polarization angle set for each of the polarizing filters is set to a polarization angle at which an amount of noise amplification due to the interference removal processing is reduced as compared with a case where the differences are all equal.

(17) The imaging method according to (12) or (13), in which the polarization angle set for each of the polarizing filters is set to a polarization angle at which an amount of noise amplification due to the interference removal processing is minimized.

(18) The imaging method according to (12) or (13), in which the polarization angle set for each of the polarizing filters is set to a polarization angle at which an amount of interference between the image signal in the aperture region having a relatively low sensitivity and the image signal in the other aperture region is reduced.

(19) The imaging method according to (12) or (13), in which, in a case where the interference removal processing is performed based on an interference matrix, the polarization angle set for each of the polarizing filters is set to a polarization angle at which the number of conditions of the interference matrix is reduced as compared with a case where the differences are all equal.

(20) The imaging method according to (12) or (13), in which, in a case where the interference removal processing is performed based on an interference matrix, the polarization angle set for each of the polarizing filters is set to a polarization angle at which the number of conditions of the interference matrix is minimized.

BRIEF DESCRIPTION OF THE DRAWINGS

FIG. 16 illustrates tables showing an example of a method for adjusting a polarization angle.
FIG. 18 is a diagram showing an example of a calculation result of an evaluation value of noise in each noise evaluation method.
FIG. 19 is a diagram showing an example of adjusting a polarization angle based on each noise evaluation method.
FIG. 23 is a diagram showing another example of adjusting a polarization angle based on each noise evaluation method.

DESCRIPTION OF THE PREFERRED EMBODIMENTS

Hereinafter, a preferred embodiment of the present invention will be described in detail with reference to the accompanying drawings.

[Configuration of Imaging Apparatus]

Here, a case of capturing an image of three wavelength ranges (a three-band multispectral image) will be described as an example.

Figure 1:
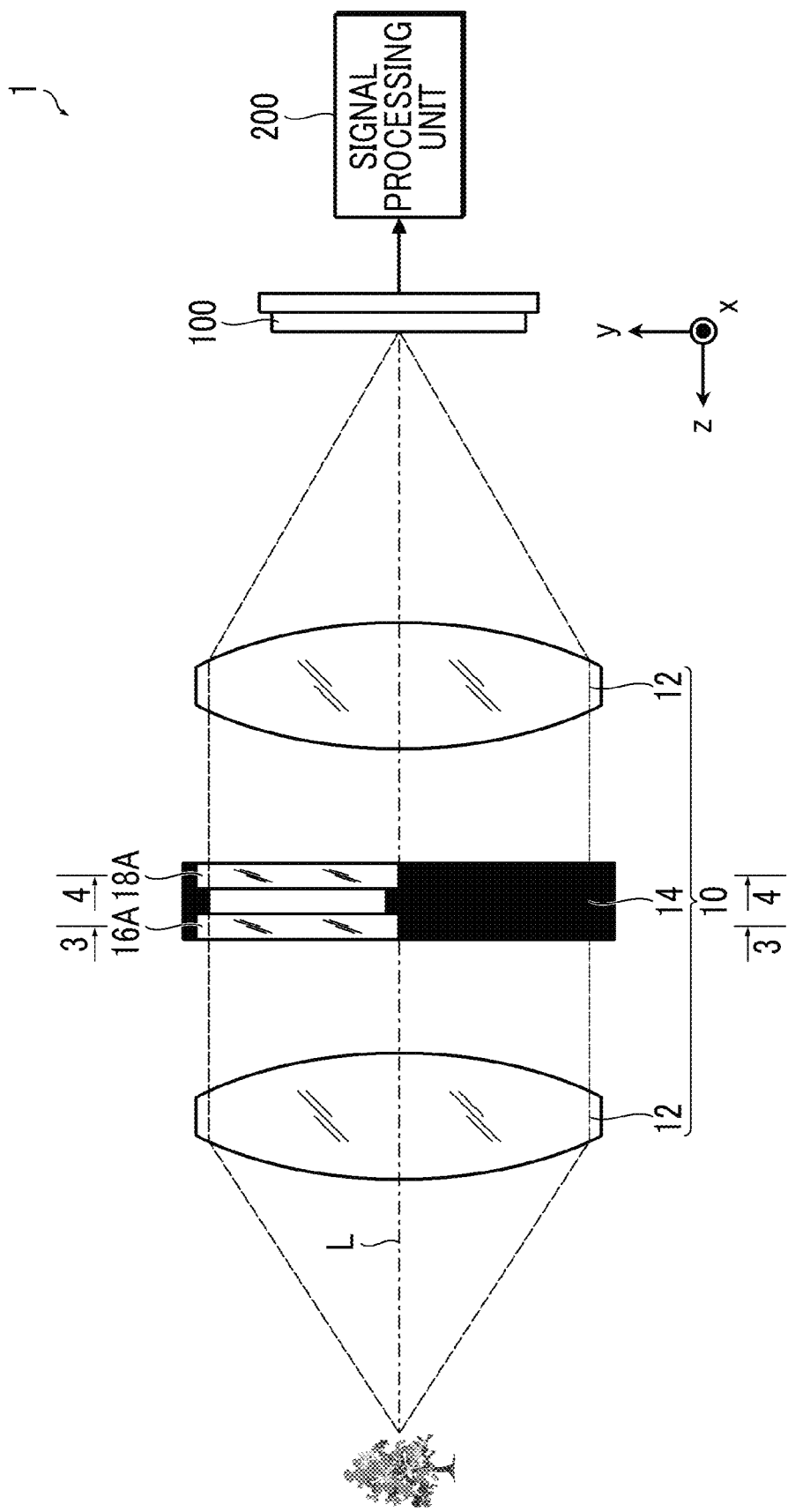
FIG. 1 is a diagram showing a schematic configuration of an imaging apparatus.

FIG. 1 is a diagram showing a schematic configuration of an imaging apparatus. As shown in FIG. 1, the imaging apparatus 1 comprises an imaging lens 10, an image sensor 100, and a signal processing unit 200.

[Imaging Lens]

The imaging lens 10 is configured by combining a plurality of lenses 12. The imaging lens 10 is focused by moving a part of the lens group or the whole lens group back and forth along an optical axis L. The imaging lens 10 is an example of an optical system.

As shown in FIG. 1, the imaging lens 10 has an aperture plate 14 on the optical axis L. The aperture plate 14 is disposed at a pupil position of the imaging lens 10 or near the pupil position. The "near the pupil position" means from the entrance pupil to the exit pupil.

Figure 2:
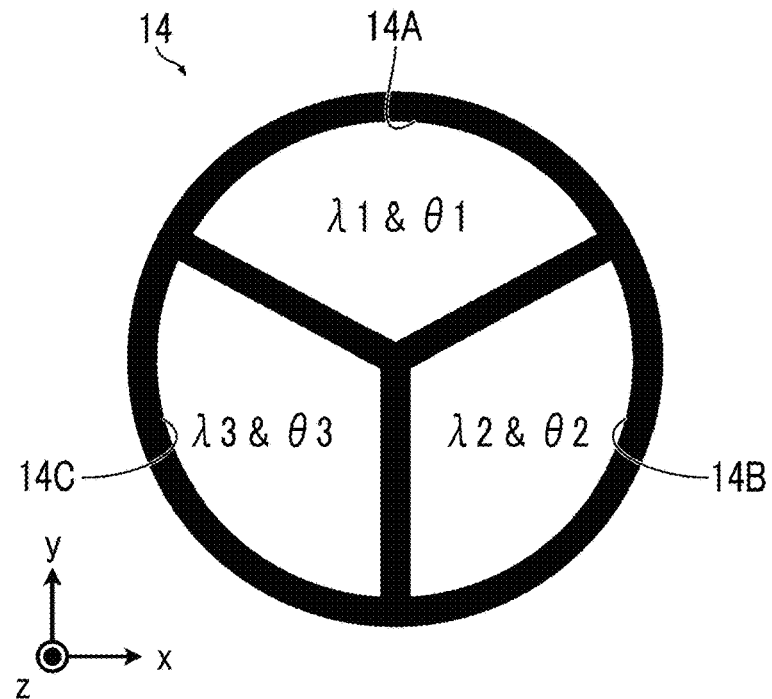
FIG. 2 is a front view of an aperture plate.

FIG. 2 is a front view of the aperture plate. As shown in FIG. 2, the aperture plate 14 has three aperture regions 14A, 14B, and 14C. Hereinafter, the three aperture regions 14A to 14C are distinguished by using the aperture region 14A as a first aperture region 14A, the aperture region 14B as a second aperture region 14B, and the aperture region 14C as a third aperture region 14C, as needed. The aperture plate 14 has a disk shape and is divided into three equal parts in the circumferential direction to include three aperture regions 14A to 14C.

Figure 3:
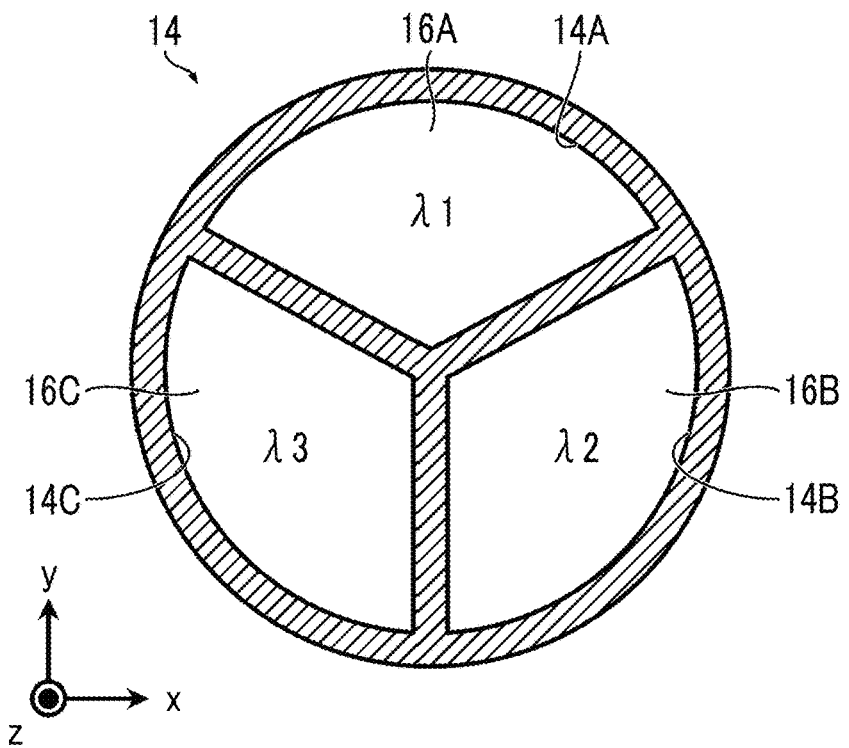
FIG. 3 is a cross-sectional view along line 3-3 of FIG. 1.
Figure 4:
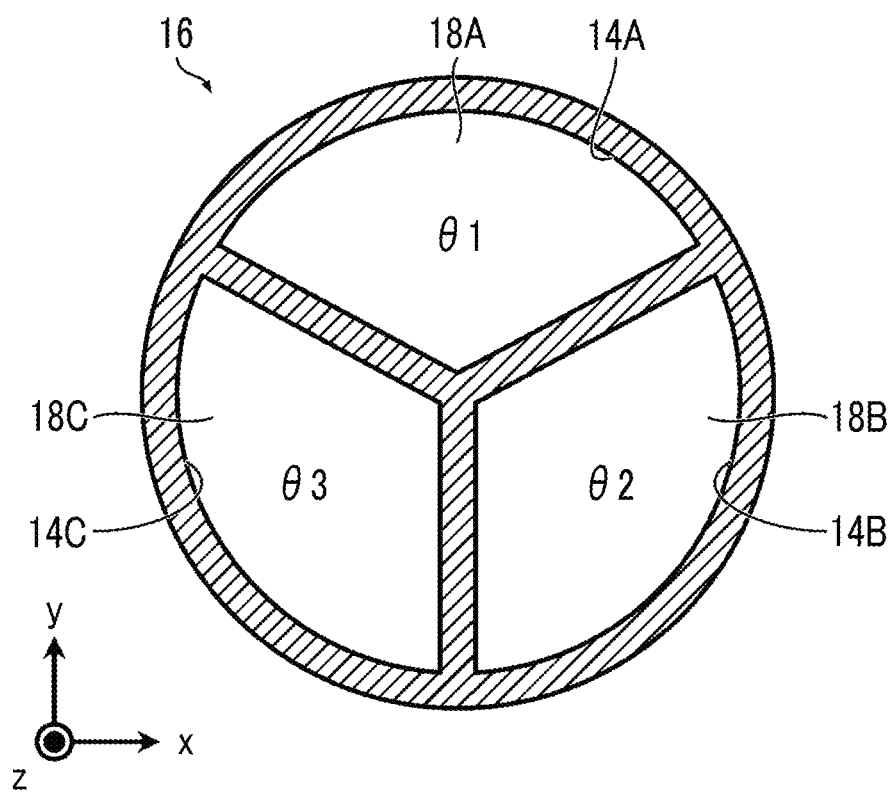
FIG. 4 is a cross-sectional view along line 4-4 of FIG. 1.

FIG. 3 is a cross-sectional view along line 3-3 of FIG. 1. FIG. 4 is a cross-sectional view along line 4-4 of FIG. 1. As shown in FIGS. 3 and 4, the aperture regions 14A, 14B, and 14C are provided with bandpass filters 16A, 16B, and 16C and polarizing filters 18A, 18B, and 18C, respectively. Hereinafter, the three bandpass filters 16A to 16C are distinguished by using the bandpass filter 16A provided in the first aperture region 14A as a first bandpass filter 16A, the bandpass filter 16B provided in the second aperture region 14B as a second bandpass filter 16B, and the bandpass filter 16C provided in the third aperture region 14C as a third bandpass filter 16C, as needed. Further, the three polarizing filters 18A to 18C are distinguished by using the polarizing filter 18A provided in the first aperture region 14A as a first polarizing filter 18A, the polarizing filter 18B provided in the second aperture region 14B as a second polarizing filter 18B, and the polarizing filter 18C provided in the third aperture region 14C as a third polarizing filter 18C.

The types of the bandpass filters 16A to 16C are different from each other. That is, the wavelength ranges (transmission wavelength ranges) of the transmitted light are different from each other. The first bandpass filter 16A transmits light in a wavelength range $\lambda 1$. The second bandpass filter 16B transmits light in a wavelength range $\lambda 2$. The third bandpass filter 16C transmits light in a wavelength range $\lambda 3$. As the transmission wavelength range of each of the bandpass filters 16A, 16B, and 16C, a wavelength range corresponding to each wavelength range of the multispectral image to be captured is set. This example is an example in which an image having the wavelength range $\lambda 1$, the wavelength range $\lambda 2$, and the wavelength range $\lambda 3$ is captured as a multispectral image.

The types of the polarizing filters 18A to 18C are different from each other. That is, the polarization angles (transmitted polarization angles) of the transmitted light are different from each other. The first polarizing filter 18A transmits light (linearly polarized light) having a polarization angle $\theta 1$. The second polarizing filter 18B transmits light (linearly polarized light) having a polarization angle $\theta 2$. The third polarizing filter 18C transmits light (linearly polarized light) having a polarization angle $\theta 3$. The polarization angle is set in the range of 0° or more and less than 180°, where the horizontal is 0°.

In the imaging apparatus 1 of the present embodiment, the polarization angles (azimuthal angles) that are not at equal intervals are set in the polarizing filters 18A to 18C. That is, in a case where the polarizing filters 18A to 18C are arranged in the order of the polarization angles, the polarization angles $\theta 1$ to $\theta 3$ of the polarizing filters 18A to 18C are set such that at least one of differences in the polarization angles of the adjacent polarizing filters 18A to 18C is different from the others. For example, it is assumed that the relationship between the polarization angles $\theta 1$ to $\theta 3$ of the three polarizing filters 18A to 18C is $\theta 1 < \theta 2 < \theta 3$. In this case, the first polarizing filter 18A and the second polarizing filter 18B are in a relationship of adjacent polarizing filters, and the second polarizing filter 18B and the third polarizing filter 18C are in a relationship of adjacent polarizing filters. Therefore, a difference ($|\theta 2 - \theta 1|$) in the polarization angles of the first polarizing filter 18A and the second polarizing filter 18B and a difference ($|\theta 3 - \theta 2|$) in the polarization angles of the second polarizing filter 18B and the third polarizing filter 18C are different from each other. The specific setting method of the polarization angles $\theta 1$ to $\theta 3$ set in each of the polarizing filters 18A to 18C will be described later.

The aperture plate 14 is disposed at a pupil position of the imaging lens 10 or near the pupil position. Thus, the pupil region of the imaging lens 10 is divided into three regions (three pupil regions). Specifically, the pupil region is divided into a first pupil region defined by the first aperture region 14A of the aperture plate 14, a second pupil region defined by the second aperture region 14B of the aperture plate 14, and a third pupil region defined by the third aperture region 14C of the aperture plate 14. The light incident on the imaging lens 10 passes through each pupil region (each of the aperture regions 14A, 14B, and 14C) and is incident on the image sensor 100.

Each of the aperture regions 14A to 14C is provided with the bandpass filters 16A to 16C and the polarizing filters 18A to 18C, respectively. Therefore, light having different optical characteristics is incident on the image sensor 100 from each of the aperture regions 14A to 14C. Specifically, from the first aperture region 14A, light having the wavelength range $\lambda 1$ and the polarization angle $\theta 1$ is incident on the image sensor 100. From the second aperture region 14B, light having the wavelength range $\lambda 2$ and the polarization angle $\theta 2$ is incident on the image sensor 100. From the third aperture region 14C, light having the wavelength range $\lambda 3$ and the polarization angle $\theta 3$ is incident on the image sensor 100.

[Image Sensor]

The image sensor 100 of the present embodiment is composed of an image sensor (so-called polarized image sensor) having a polarizing element (polarizing filter element) in each pixel.

Figure 5:
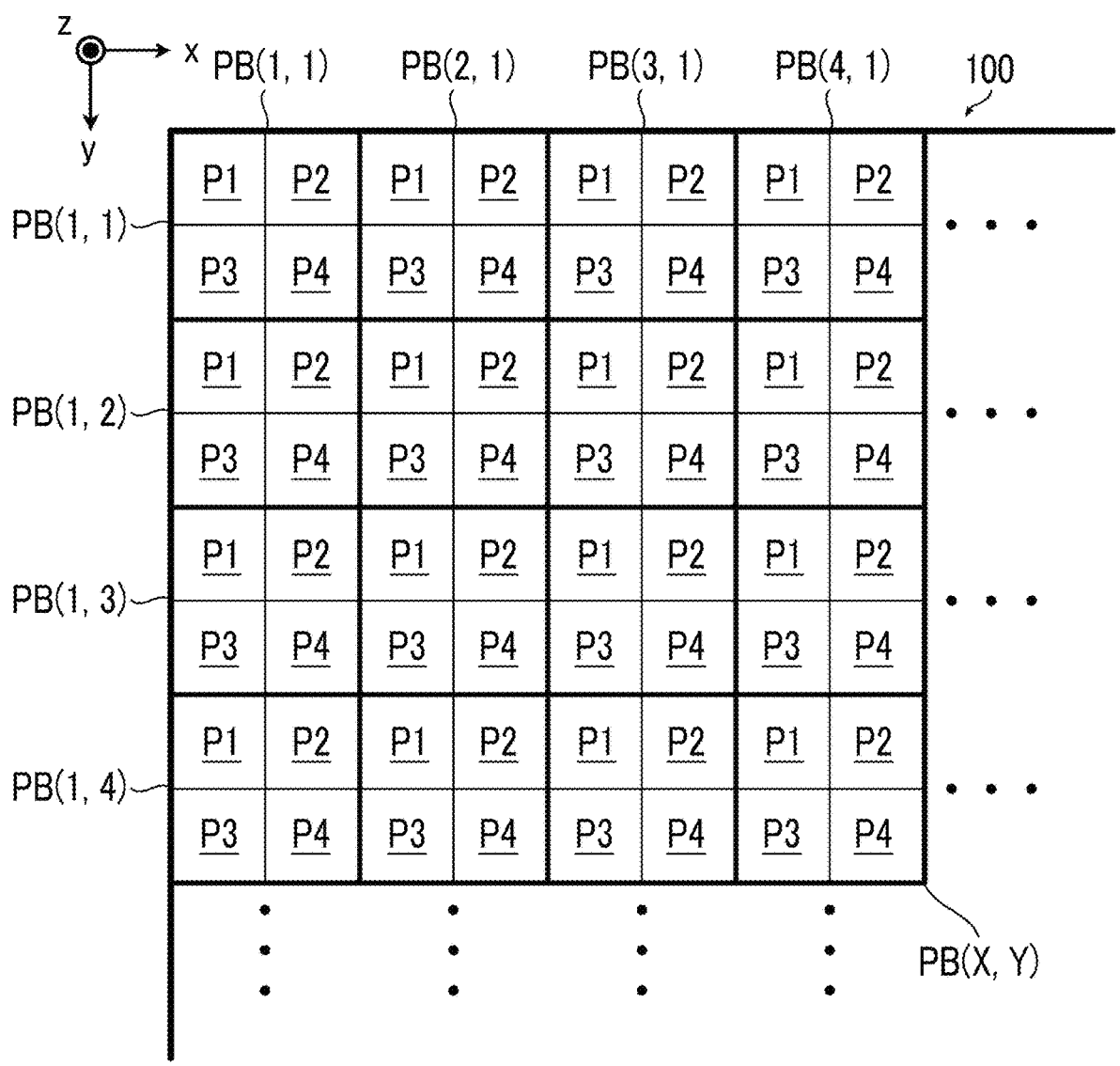
FIG. 5 is a diagram showing a schematic configuration of an arrangement of pixels of an image sensor.

FIG. 5 is a diagram showing a schematic configuration of an arrangement of pixels of an image sensor.

As shown in FIG. 5, the image sensor 100 has a plurality of types of pixels P1, P2, P3, and P4 on the light-receiving surface thereof. The pixels P1 to P4 are regularly arranged at a certain pitch along a horizontal direction (x-axis direction) and a vertical direction (y-axis direction).

In the image sensor 100 according to the present embodiment, one pixel block PB (X,Y) is configured by 4 (2×2) adjacent pixels P1 to P4, and the pixel blocks PB (X,Y) are regularly arranged along the horizontal direction (x-axis direction) and the vertical direction (y-axis direction). Hereinafter, the pixels P1 to P4 are distinguished by using the pixel P1 as a first pixel P1, the pixel P2 as a second pixel P2, the pixel P3 as a third pixel P3, and the pixel P4 as a fourth pixel P4, as needed. Each of the pixels P1 to P4 has different optical characteristics.

Figure 6:
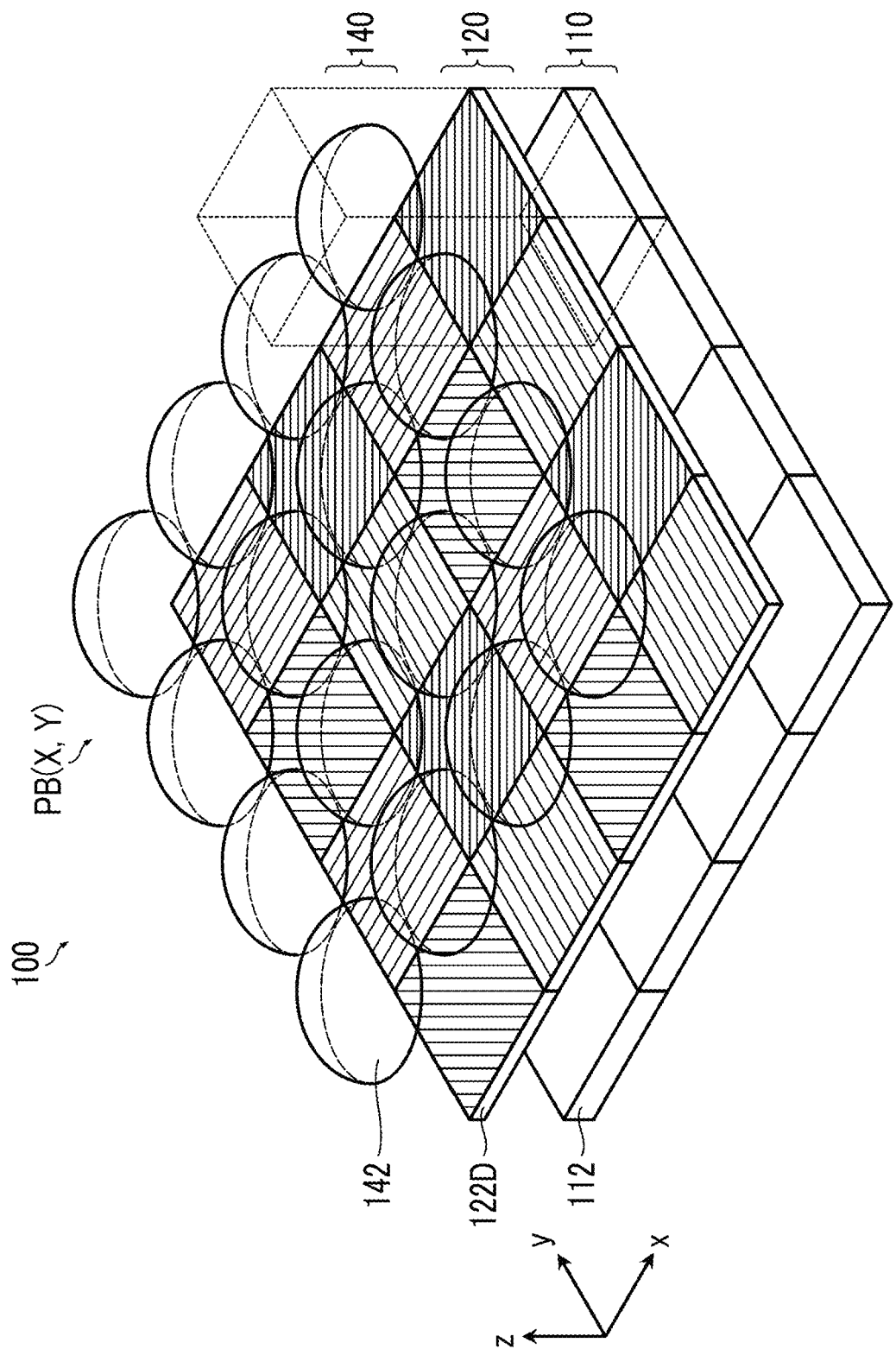
FIG. 6 is a diagram showing a schematic configuration of the image sensor.
Figure 7:
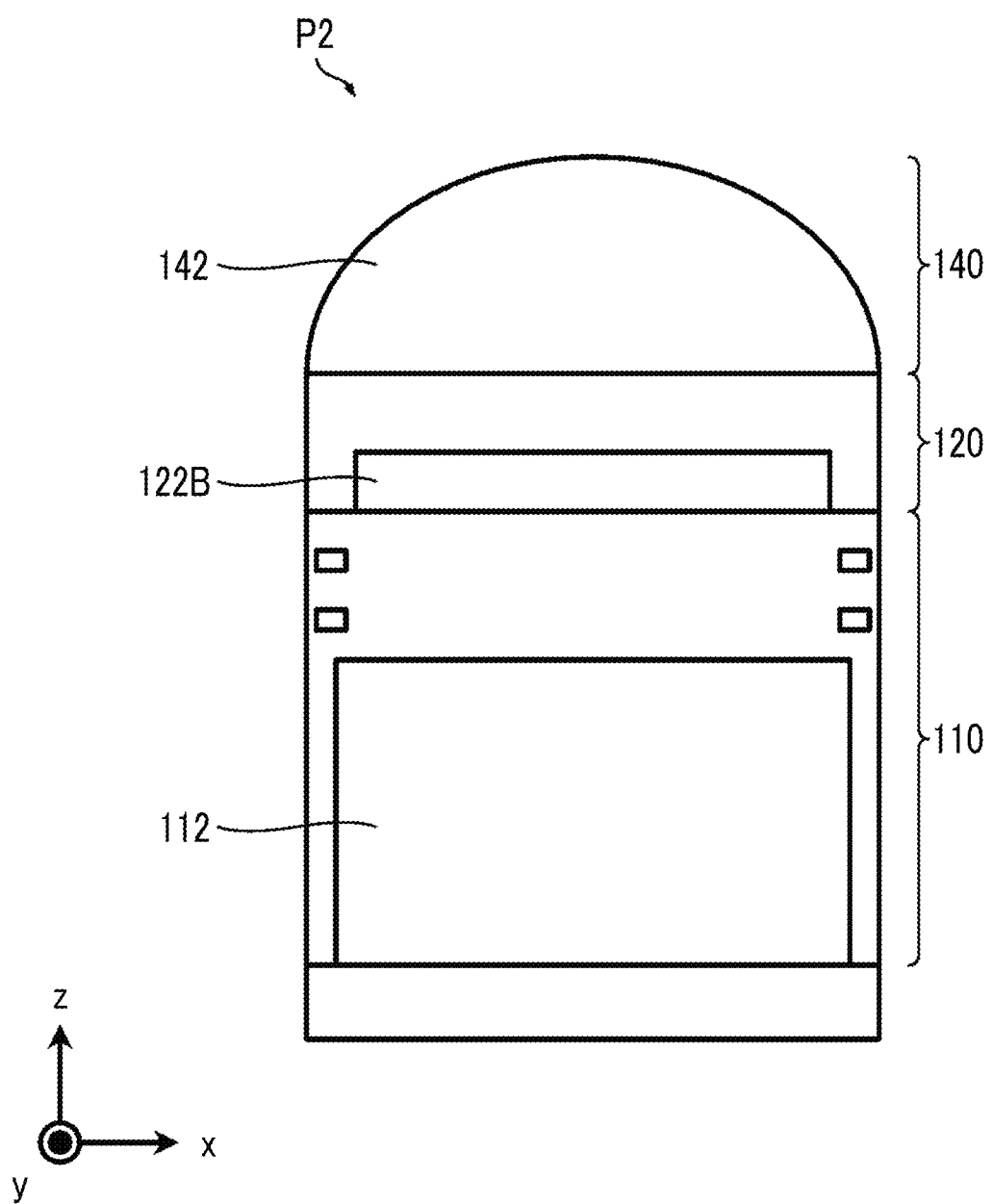
FIG. 7 is a cross-sectional view showing a schematic configuration of one pixel (broken line portion in FIG. 6).

FIG. 6 is a diagram showing a schematic configuration of the image sensor. FIG. 7 is a cross-sectional view showing a schematic configuration of one pixel (broken line portion in FIG. 6).

The image sensor 100 includes a pixel array layer 110, a polarizing filter element array layer 120, and a micro lens array layer 140. The layers are disposed in the order of the pixel array layer 110, the polarizing filter element array layer 120, and the micro lens array layer 140 from an image plane side to an object side.

The pixel array layer 110 is configured by two-dimensionally arranging a large number of photodiodes 112. One photodiode 112 configures one pixel. The photodiodes 112 are regularly disposed along the horizontal direction (x direction) and the vertical direction (y direction).

The polarizing filter element array layer 120 is configured by two-dimensionally arranging four types of polarizing filter elements 122A, 122B, 122C, and 122D. Hereinafter, the polarizing filter elements 122A to 122D are distinguished by using the polarizing filter element 122A as a first polarizing filter element 122A, the polarizing filter element 122B as a second polarizing filter element 122B, the polarizing filter element 122C as a third polarizing filter element 122C, and the polarizing filter element 122D as a fourth polarizing filter element 122D, as needed. Each of the polarizing filter elements 122A to 122D, one of which is provided for each pixel, is disposed at the same intervals as the photodiodes 112. Each of the polarizing filter elements 122A to 122D has a different polarization angle of the transmitted light. The first polarizing filter element 122A transmits light having a polarization angle Θ1. The second polarizing filter element 122B transmits light having a polarization angle Θ2. The third polarizing filter element 122C transmits light having a polarization angle Θ3. The fourth polarizing filter element 122D transmits light having a polarization angle Θ4. The polarization angle is set in the range of 0° or more and less than 180°, where the horizontal is 0°. In the present embodiment, the polarization angles Θ1 to Θ4 of the polarizing filter elements 122A to 122D are set so as to be at equal intervals. That is, in a case where the polarizing filter elements 122A to 122D are arranged in the order of the polarization angles, the polarization angles Θ1 to Θ4 of the polarizing filter elements 122A to 122D are set such that differences in the polarization angles of the adjacent polarizing filters are all equal. Specifically, the polarization angle of the first polarizing filter element 122A is set to 0°, the polarization angle of the second polarizing filter element 122B is set to 45°, the polarization angle of the third polarizing filter element 122C is set to 90°, and the polarization angle of the fourth polarizing filter element 122D is set to 135°. In this case, the polarization angles Θ1 to Θ4 of the polarizing filter elements 122A to 122D are set at intervals of 45°.

Figure 8:
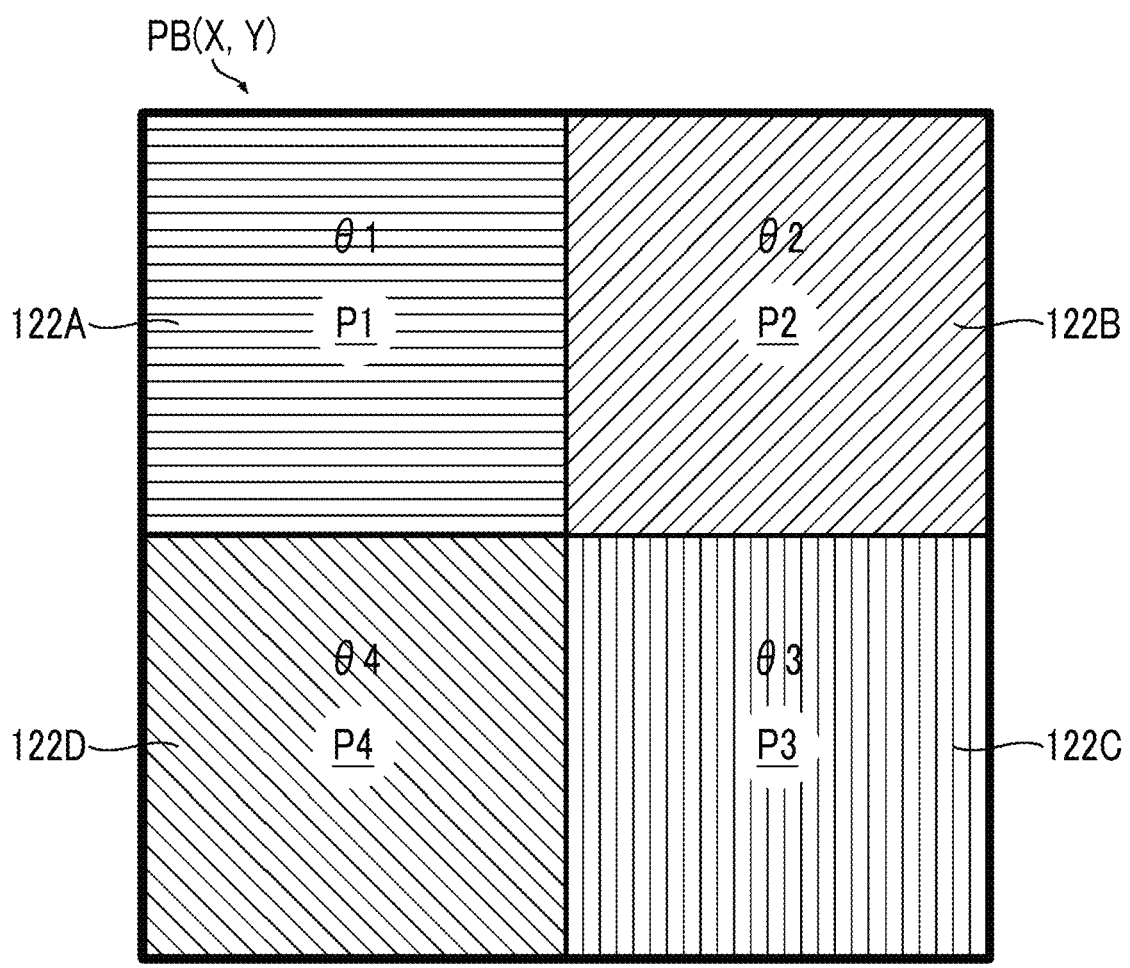
FIG. 8 is a diagram showing an example of an arrangement pattern of polarizing filter elements in each pixel block.

FIG. 8 is a diagram showing an example of an arrangement pattern of polarizing filter elements in each pixel block.

As shown in FIG. 8, in the imaging apparatus of the present embodiment, the first pixel P1 is provided with the first polarizing filter element 122A, the second pixel P2 is provided with the second polarizing filter element 122B, the third pixel P3 is provided with the third polarizing filter element 122C, and the fourth pixel P4 is provided with the fourth polarizing filter element 122D. Therefore, the first pixel P1 receives light (linearly polarized light) having the polarization angle Θ1. The second pixel P2 receives light (linearly polarized light) having the polarization angle of Θ2. The third pixel P3 receives light (linearly polarized light) having the polarization angle of Θ3. The fourth pixel P4 receives light (linearly polarized light) having the polarization angle of Θ4.

The micro lens array layer 140 is configured by two-dimensionally arranging a large number of micro lenses 142. Each micro lens 142, one of which is provided for each pixel, is disposed at the same intervals as the photodiodes 112. The micro lenses 142 are provided for a purpose of efficiently condensing the light from the imaging lens 10 on the photodiodes 112.

In the image sensor 100 configured as described above, in each pixel block PB (X,Y), each of the pixels P1, P2, P3, and P4 receives the light from the imaging lens 10 as follows. That is, the first pixel P1 receives light having the polarization angle Θ1 via the first polarizing filter element 122A. The second pixel P2 receives light having the polarization angle Θ2 via the second polarizing filter element 122B. The third pixel P3 receives light having the polarization angle Θ3 via the third polarizing filter element 122C. The fourth pixel P4 receives light having the polarization angle Θ4 via the fourth polarizing filter element 122D. In this way, each of the pixels P1, P2, P3, and P4 of the pixel block PB (X, Y) receives light having different polarization angles Θ1 to Θ4.

[Signal Processing Unit]

The signal processing unit 200 processes the signal output from the image sensor 100 to generate an image signal (image data) in each of the aperture regions 14A to 14C of the imaging lens 10. As described above, in the imaging apparatus 1 of the present embodiment, the bandpass filters 16A to 16C are provided in the aperture regions 14A to 14C of the imaging lens 10. Therefore, by generating the image signals in the aperture regions 14A to 14C, the image signals of the images corresponding to the transmission wavelength ranges λ1 to λ3 of the bandpass filters 16A to 16C are generated.

Figure 9:
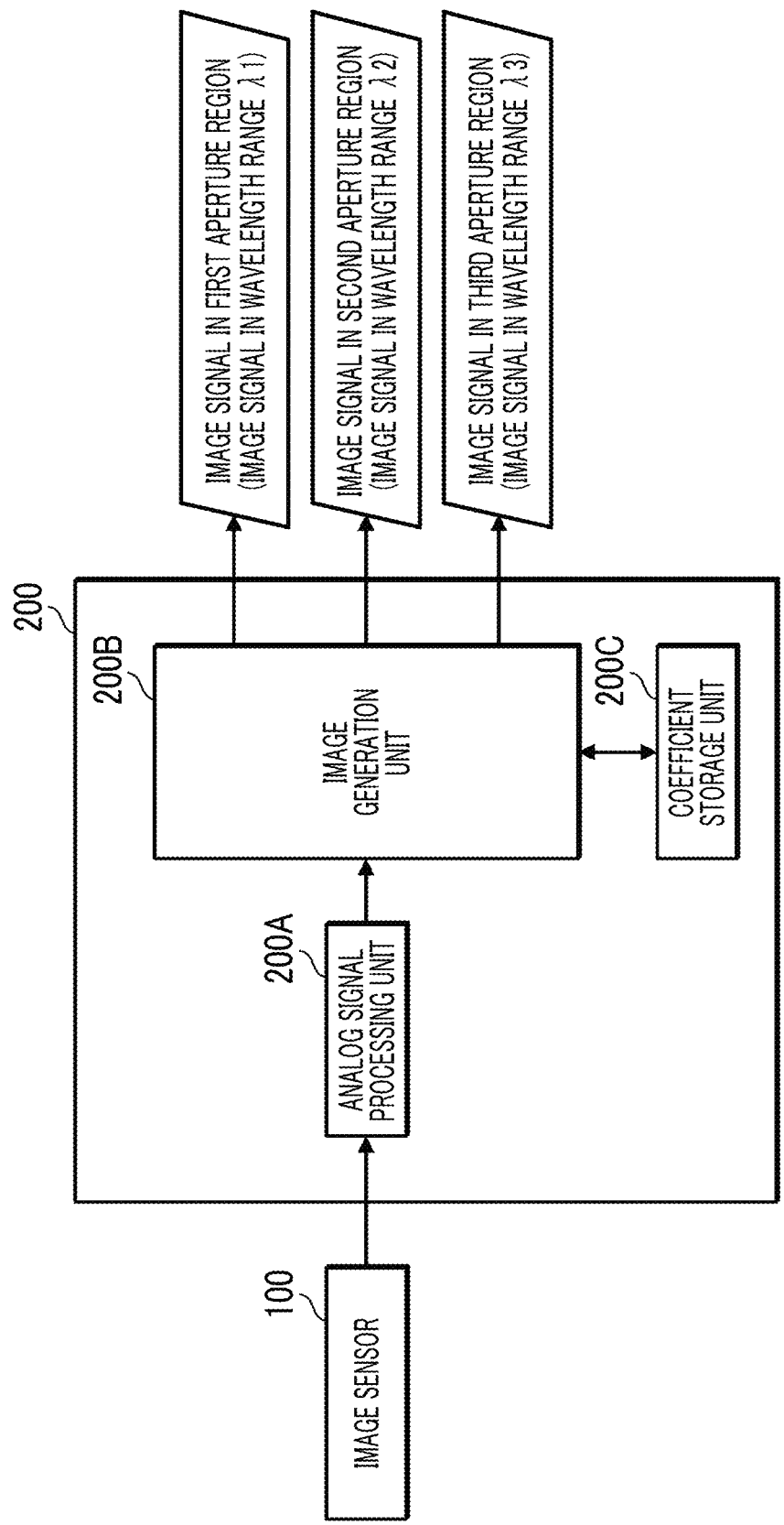
FIG. 9 is a block diagram showing a schematic configuration of a signal processing unit.

FIG. 9 is a block diagram showing a schematic configuration of a signal processing unit.

As shown in FIG. 9, the signal processing unit 200 includes an analog signal processing unit 200A, an image generation unit 200B, and a coefficient storage unit 200C.

The analog signal processing unit 200A takes in an analog pixel signal output from each pixel of the image sensor 100, performs predetermined signal processing (for example, sampling two correlation pile processing, amplification processing, and the like), then converts the processed pixel signal into a digital signal, and then outputs the converted digital signal.

The image generation unit 200B performs predetermined signal processing on the pixel signal after being converted into a digital signal to generate image signals in the aperture regions 14A, 14B, and 14C of the imaging lens 10. That is, image signals in the wavelength ranges λ1 to λ3 are generated. The image generation unit 200B is composed of a processor, and the processor executes a predetermined program to realize the function of the image generation unit 200B.

Figure 10:
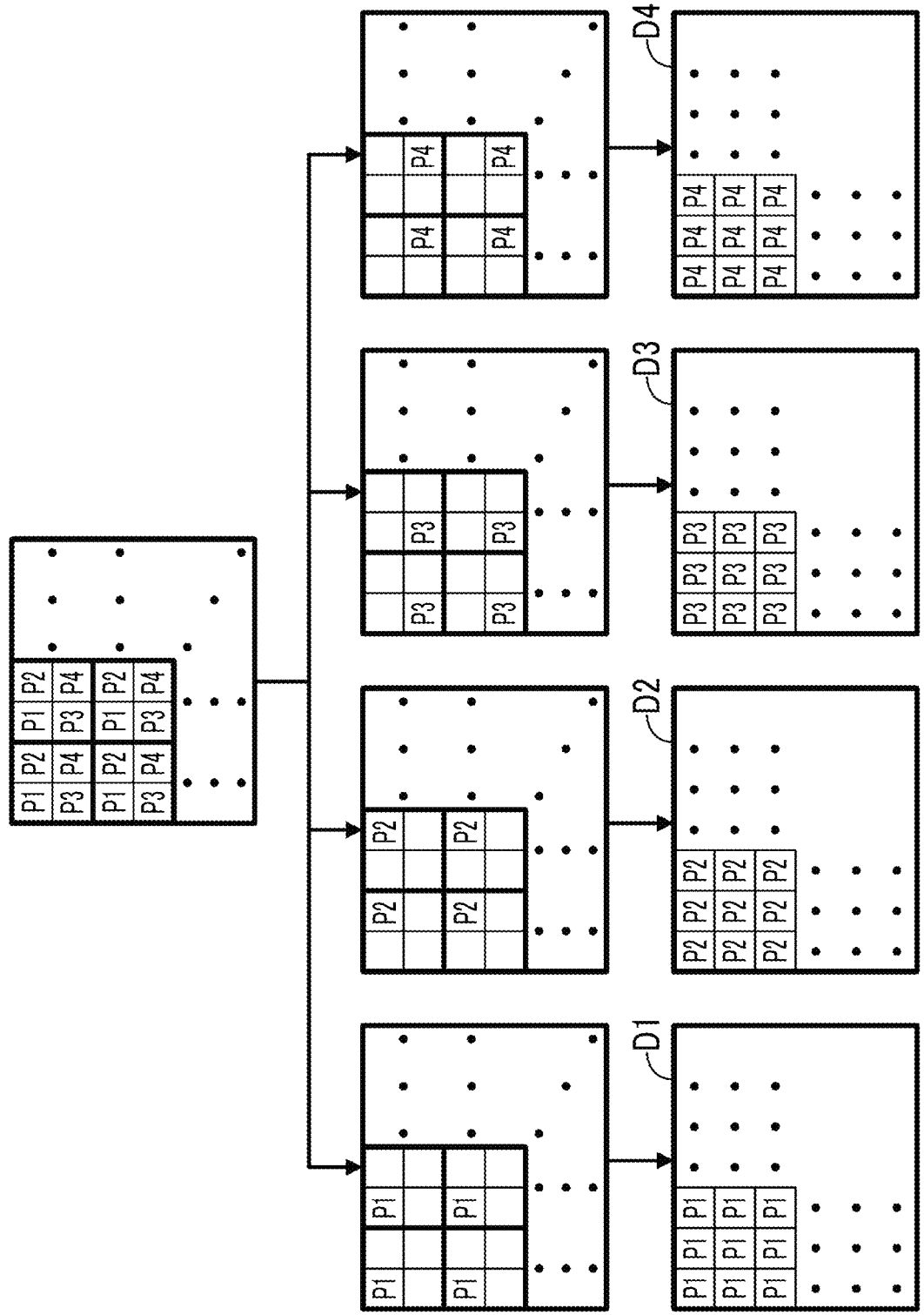
FIG. 10 is a conceptual diagram of image generation.

FIG. 10 is a conceptual diagram of image generation.

Each pixel block PB (X, Y) includes a first pixel P1, a second pixel P2, a third pixel P3, and a fourth pixel P4. Therefore, four image signals D1, D2, D3, and D4 are generated by separating and extracting the pixel signals of the first pixel P1, the second pixel P2, the third pixel P3, and the fourth pixel P4 from each pixel block PB (X,Y). However, interference (crosstalk) has occurred in these four image signals D1 to D4. That is, since the light from the aperture regions 14A and 14B is incident on each of the pixels P1 to P4, the generated image is an image in which images of the aperture regions 14A to 14C are mixed. Therefore, the image generation unit 200B performs processing for removing interference (interference removal processing) to generate image signals in the aperture regions 14A to 14C.

Hereinafter, the interference removal processing performed by the signal processing unit 200 will be described.

A pixel signal (signal value) obtained by the first pixel P1 of each pixel block PB (X, Y) is referred to as α1, a pixel signal obtained by the second pixel P2 thereof is referred to as α2, a pixel signal obtained by the third pixel P3 thereof is referred to as α3, and a pixel signal obtained by the fourth pixel P4 thereof is referred to as α4. From each pixel block PB (X, Y), four pixel signals α1, α2, α3, and α4 are obtained. The image generation unit 200B performs predetermined signal processing on the four pixel signals α1 to α4 to remove interference, and calculates pixel signals β1, β2, and β3 of the aperture regions 14A to 14C. Specifically, the pixel signals β1 to β3 of the aperture regions 14A to 14C are calculated through Equation 1 using the following matrix (interference removal matrix) A.

$$A = \begin{bmatrix} a11 & a12 & a13 & a14 \\ a21 & a22 & a23 & a24 \\ a31 & a32 & a33 & a34 \end{bmatrix} \quad \text{Equation 1}$$

$$\begin{bmatrix} \beta1 \\ \beta2 \\ \beta3 \end{bmatrix} = \begin{bmatrix} a11 & a12 & a13 & a14 \\ a21 & a22 & a23 & a24 \\ a31 & A32 & a33 & a34 \end{bmatrix} * \begin{bmatrix} \alpha1 \\ \alpha2 \\ \alpha3 \\ \alpha4 \end{bmatrix}$$

The pixel signal β1 is a pixel signal corresponding to the first aperture region 14A, the pixel signal β2 is a pixel signal corresponding to the second aperture region 14B, and the pixel signal β3 is a pixel signal corresponding to the third aperture region 14C. Therefore, an image signal corresponding to the first aperture region 14A is generated from the pixel signal β1, an image signal corresponding to the second aperture region 14B is generated from the pixel signal β2, and an image signal corresponding to the third aperture region 14C is generated from the pixel signal β3.

The interference removal matrix A is obtained as follows.

The ratio (interference amount) at which the pixel signals β1 to β3 of the aperture regions 14A to 14C interfere with the pixel signals α1 to α4 of the pixels P1 to P4 is defined as bij (i=1 to 4, j=1 to 3).

b11 is the ratio at which the pixel signal β1 of the first aperture region 14A interferes with the pixel signal α1 of the first pixel P1. b12 is the ratio at which the pixel signal β2 of the second aperture region 14B interferes with the pixel signal α1 of the first pixel P1. b13 is the ratio at which the pixel signal β3 of the third aperture region 14C interferes with the pixel signal α1 of the first pixel P1.

b21 is the ratio at which the pixel signal β1 of the first aperture region 14A interferes with the pixel signal α2 of the second pixel P2. b22 is the ratio at which the pixel signal β2 of the second aperture region 14B interferes with the pixel signal α2 of the second pixel P2. b23 is the ratio at which the pixel signal β3 of the third aperture region 14C interferes with the pixel signal α2 of the second pixel P2.

b31 is the ratio at which the pixel signal β1 of the first aperture region 14A interferes with the pixel signal α3 of the third pixel P3. b32 is the ratio at which the pixel signal β2 of the second aperture region 14B interferes with the pixel signal α3 of the third pixel P3. b33 is the ratio at which the pixel signal β3 of the third aperture region 14C interferes with the pixel signal α3 of the third pixel P3.

b41 is the ratio at which the pixel signal β1 of the first aperture region 14A interferes with the pixel signal α4 of the fourth pixel P4. b42 is the ratio at which the pixel signal β2 of the second aperture region 14B interferes with pixel signal α4 of the fourth pixel P4. b43 is the ratio at which the pixel signal β3 of the third aperture region 14C interferes with pixel signal α4 of the fourth pixel P4.

The following relationship is satisfied between the pixel signals α1 to α4 obtained by the pixels P1 to P4 of each pixel block PB (X,Y) and the pixel signals β1 to β3 of the aperture regions 14A to 14C.

Regarding the pixel signal α1 obtained by the first pixel P1, the relationship of the following Equation 2 is satisfied ("*" is a symbol of integration).

$$b11*\beta1 + b12*\beta2 + b13*\beta3 = \alpha1 \quad (2)$$

Regarding the pixel signal α2 obtained by the second pixel P2, the relationship of the following Equation 3 is satisfied.

$$b21*\beta1 + b22*\beta2 + b23*\beta3 = \alpha2 \quad (3)$$

Regarding the pixel signal α3 obtained by the third pixel P3, the relationship of the following Equation 4 is satisfied.

$$b31*\beta1 + b32*\beta2 + b33*\beta3 = \alpha3 \quad (4)$$

Regarding the pixel signal α4 obtained by the fourth pixel P4, the relationship of the following Equation 5 is satisfied.

$$b41*\beta1 + b42*\beta2 + b43*\beta3 = \alpha4 \quad (5)$$

Here, the simultaneous equations of Equations 2 to 5 can be expressed by the following Equation 6 using the matrix (interference matrix) B.

$$B = \begin{bmatrix} b11 & b12 & b13 \\ b21 & b22 & b23 \\ b31 & b32 & b33 \\ b41 & b42 & b43 \end{bmatrix} \quad \text{Equation 6}$$

$$\begin{bmatrix} b11 & b12 & b13 \\ b21 & b22 & b23 \\ b31 & b32 & b33 \\ b41 & b42 & b43 \end{bmatrix} * \begin{bmatrix} \beta1 \\ \beta2 \\ \beta3 \end{bmatrix} = \begin{bmatrix} \alpha1 \\ \alpha2 \\ \alpha3 \\ \alpha4 \end{bmatrix}$$

The interference matrix B is a matrix having the ratio bij at which the pixel signals β1 to β3 of the aperture regions 14A to 14C interfere with the pixel signals α1 to α4 of the pixels P1 to P4 as an element.

β1 to β3, which are the solutions of the simultaneous equations of Equations 2 to 5, are calculated by multiplying both sides of above Equation 6 by an inverse matrix $B^{-1}$ of the interference matrix B.

$$\begin{bmatrix} \beta1 \\ \beta2 \\ \beta3 \end{bmatrix} = \begin{bmatrix} b11 & b12 & b13 \\ b21 & b22 & b23 \\ b31 & b32 & b33 \\ b41 & b42 & b43 \end{bmatrix}^{-1} * \begin{bmatrix} \alpha1 \\ \alpha2 \\ \alpha3 \end{bmatrix} \quad \text{Equation 7}$$

In this way, the pixel signals β1 to β3 of the aperture regions 14A to 14C can be calculated from the signal values (pixel signals) α1 to α4 of the pixels P1 to P4 of each pixel block PB (X, Y) by using Equation 7.

In Equation 1, the inverse matrix $B^{-1}$ of Equation 7 is set to the interference removal matrix A ($B^{-1}$=A). Therefore, the interference removal matrix A can be acquired by obtaining the interference matrix B. Further, the interference matrix B can be acquired by obtaining the interference amount (interference ratio) bij.

The coefficient storage unit 200C stores each element aij of the matrix A for performing the interference removal processing, as a coefficient group. The coefficient storage unit 200C is composed of, for example, a storage device such as a read only memory (ROM), a erasable programmable read-only memory (EEPROM), and a hard disk drive (HDD).

The image generation unit 200B acquires the coefficient group from the coefficient storage unit 200C, calculates the pixel signals β1 to β3 in the aperture regions 14A to 14C via Equation 1 from the pixel signals α1 to α4 obtained from the pixels P1 to P4 of each pixel block PB (X,Y), and generates the image signals in the aperture regions 14A to 14C. The generated image signals are image signals having wavelength ranges λ1 to λ3 of light transmitted through the aperture regions 14A to 14C.

The image signals in the aperture regions 14A to 14C generated by the image generation unit 200B are output to the outside and stored in a storage device (not shown), as needed. In addition, the image signals thereof are displayed on a display (not shown), as needed.

[Imaging Operation]

Figure 11:
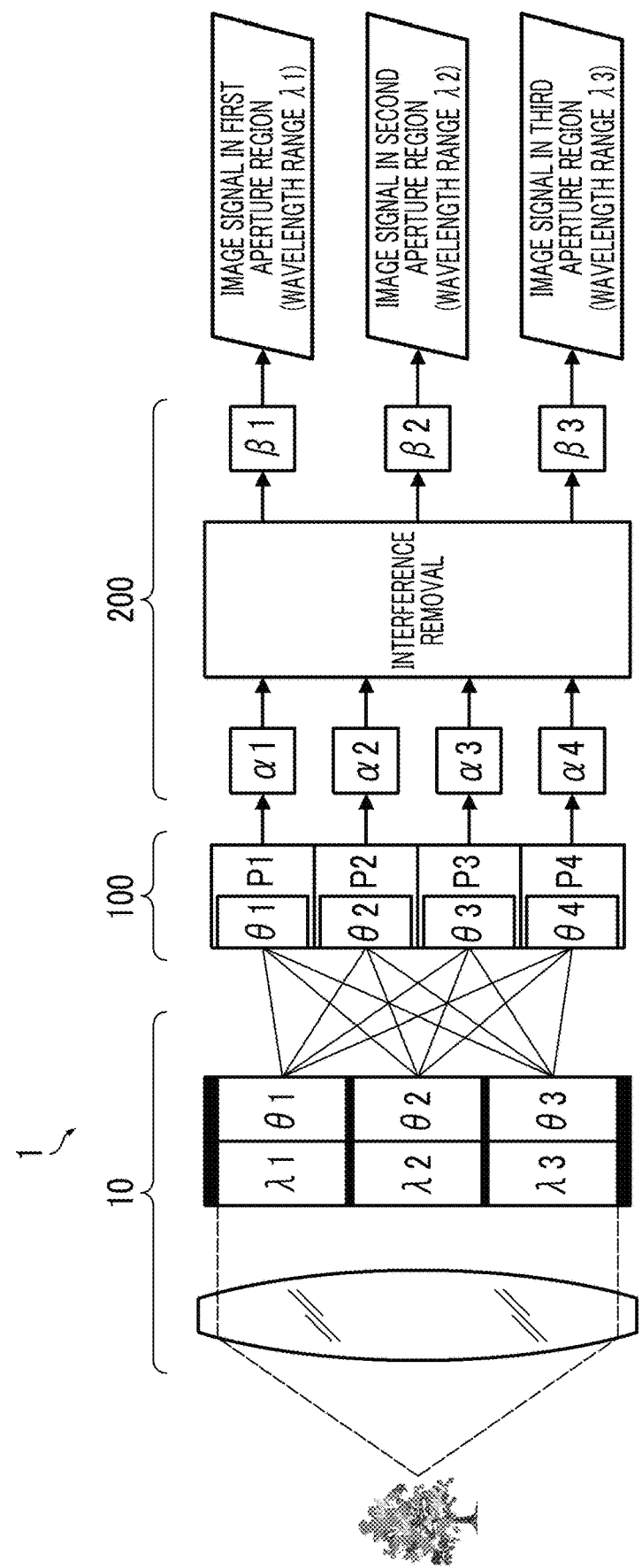
FIG. 11 is a conceptual diagram of the operation of the imaging apparatus.

FIG. 11 is a conceptual diagram of the operation of the imaging apparatus.

The light incident on the imaging lens 10 passes through the first aperture region (first pupil region) 14A, the second aperture region (second pupil region) 14B, and the third aperture region (third pupil region) 14C, and is incident on the image sensor 100. By passing through each of the aperture regions 14A to 14C, three types of light having different characteristics are formed and are incident on the image sensor 100. Specifically, from the first aperture region 14A, light having the wavelength range $\lambda 1$ and the polarization angle $\theta 1$ is incident on the image sensor 100. From the second aperture region 14B, light having the wavelength range $\lambda 2$ and the polarization angle $\theta 2$ is incident on the image sensor 100. From the third aperture region 14C, light having the wavelength range $\lambda 3$ and the polarization angle $\theta 3$ is incident on the image sensor 100.

The signal processing unit 200 processes the signal output from the image sensor 100 to generate an image signal in each of the aperture regions 14A to 14C. That is, the signals obtained from the pixels P1 to P4 of the image sensor 100 are subjected to interference removal processing to generate image signals in the aperture regions 14A to 14C. Since the aperture regions 14A to 14C transmit light in different wavelength ranges $\lambda 1$ to $\lambda 3$, image signals of the three wavelength ranges $\lambda 1$ to $\lambda 3$ are generated by generating the image signals in the aperture regions 14A to 14C.

In this way, according to the imaging apparatus 1 of the present embodiment, it is possible to capture an image (multi spectral image) having a plurality of wavelength ranges with one shot.

[Setting of Polarization Angle of Polarizing Filter of Imaging Lens]

[Overview]

In a case where the output from the image sensor is subjected to interference removal processing to generate an image of each aperture region, if there is a difference in sensitivity in the light transmitted through each aperture region, there is a problem that noise of the image of the aperture region having a relatively low sensitivity increases. That is, there is a problem that noise in an image in a wavelength range having a relatively low sensitivity increases.

Here, the sensitivity of the light transmitted through each aperture region (sensitivity of the light in each wavelength range) I is determined from the spectral characteristics of the light source, the spectral characteristics of the bandpass filter, the spectral characteristics of the imaging lens, and the spectral characteristics of the image sensor, and is expressed by the following equation.

$$I_i = \int t^l(\lambda) t_i^f(\lambda) t^o(\lambda) t^s(\lambda) d\lambda$$

$t^l(\lambda)$: Spectral characteristics of light source
$t_i^f(\lambda)$: Spectral characteristics of bandpass filter
$t^o(\lambda)$: Spectral characteristics of imaging lens
$t^s(\lambda)$: Spectral characteristics of image sensor That is, the sensitivity of the light transmitted through each aperture region is determined by multiplying the brightness intensity of the light source, the bandpass filter, the imaging lens, and the image sensor in the wavelength range of the light transmitted through each aperture region.

In a case where the interference removal processing is performed to generate an image of each aperture region, the noise amount of each image is determined by the "sensitivity of the light transmitted through each aperture region" and the "amount of noise amplification due to the interference removal processing". Further, the "amount of noise amplification due to the interference removal processing" is determined by the interference amount of the image signal in each aperture region.

In the imaging apparatus of the present embodiment, the polarization angle of the polarizing filter provided in each aperture region is adjusted to adjust the interference amount of the image signal in each aperture region, and the noise amount of the image in each aperture region is controlled. Specifically, by reducing the amount of interference between the image signal in the aperture region having a relatively low sensitivity and the image signal in the other aperture region, the noise amount of the image in the aperture region having a relatively low sensitivity is reduced, and a good multispectral image is generated as a whole.

[Description of Noise Amount]

First, the amount of noise generated in the images of the aperture regions 14A to 14C (images of the wavelength ranges $\lambda 1$ to $\lambda 3$) after the interference removal processing will be described.

As described above, the following relationship is satisfied between the pixel signals $\alpha 1$ to $\alpha 4$ of the pixels P1 to P4 of the image sensor 100 and the pixel signals $\beta 1$ to $\beta 3$ of the aperture regions 14A to 14C.

$$B * \begin{bmatrix} \beta 1 \\ \beta 2 \\ \beta 3 \end{bmatrix} = \begin{bmatrix} \alpha 1 \\ \alpha 2 \\ \alpha 3 \\ \alpha 4 \end{bmatrix}$$

The matrix B is an interference matrix.

$$B = \begin{bmatrix} b11 & b12 & b13 \\ b21 & b22 & b23 \\ b31 & b32 & b33 \\ b41 & b42 & b43 \end{bmatrix}$$

In a case where the noise amount of the pixel signals $\alpha 1$ to $\alpha 4$ of the pixels P1 to P4 is 1, a noise amount PV (PV=[PV1, PV2, PV3]) of the pixel signals $\beta 1$ to $\beta 3$ of the aperture regions 14A to 14C is derived by the following equation.

$$PV1 = \text{Abs}(B^{-1}) \times \text{sum}(B)$$

Here, Abs ($B^{-1}$) is a function that returns the absolute value of the inverse matrix $B^{-1}$ of the matrix B. Further, sum (B) is a function that returns the sum of the arrangement elements of the matrix B. That is, the columns of the interference matrix B are treated as vectors, and the sum of the respective columns is returned as a row vector.

The noise amount of the pixel signals $\alpha 1$ to $\alpha 4$ of the pixels P1 to P4 represents a noise amount of a so-called RAW image (image generated by the pixel signals $\alpha 1$ to $\alpha 4$ of the pixels P1 to P4), and the noise amount of the pixel signals $\beta 1$ to $\beta 3$ of the aperture regions 14A to 14C represents the noise amount of the image signals in the aperture regions 14A to 14C.

Figure 12:
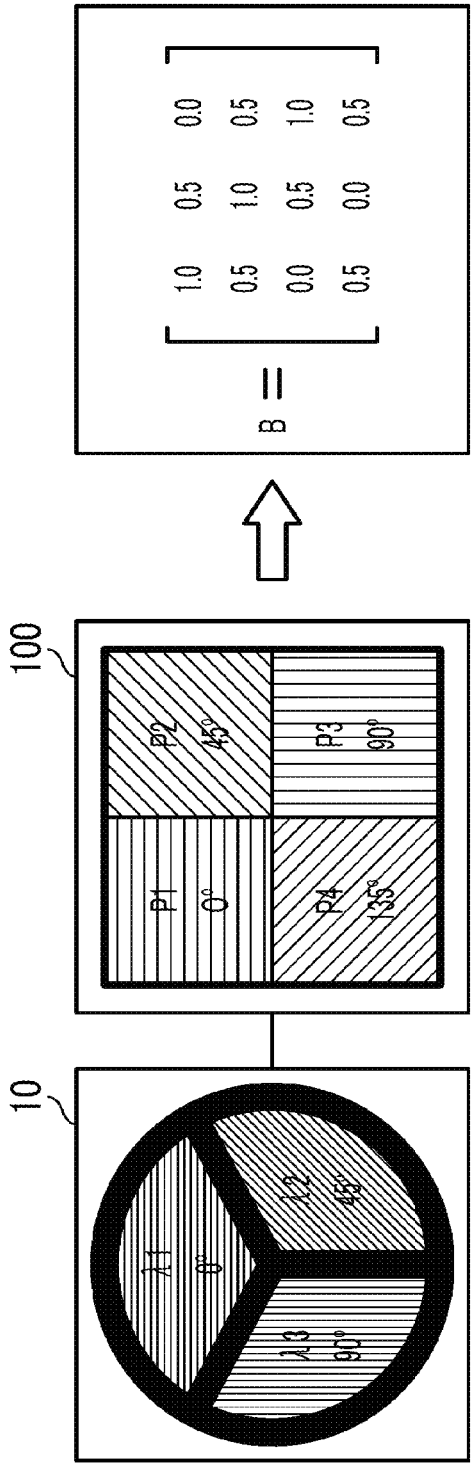
FIG. 12 is a diagram showing an example of calculating a noise amount.

FIG. 12 is a diagram showing an example of calculating a noise amount.

FIG. 12 shows an example of, in a case where the polarization angles $\theta 1$ to $\theta 3$ of the aperture regions 14A to 14C of the imaging lens 10 are set to $\theta 1=0°$, $\theta 2=45°$, and $\theta 3=90°$, and the polarization angles $\Theta 1$ to $\Theta 4$ of the pixels P1 to P4 of the image sensor 100 are set to $\Theta1=0°$, $\Theta2=45°$, $\Theta3=90°$, and $\Theta4=135°$, calculating a noise amount in a case where the sensitivities of the light transmitted through the aperture regions 14A to 14C are the same. In this case, the interference amount is obtained by the square of the cosine (cos) of the angle difference between the polarization angles set in the aperture regions 14A to 14C and the polarization angles set in the pixels P1 to P4. Therefore, the ratio bij at which the pixel signal of the j-th aperture region interferes with the pixel signal of the i-th pixel is calculated by $\cos2(|\theta j-\Theta i|)$. Here, $\Theta i$ is the polarization angle of the polarizing filter element provided in the i-th pixel, and $\theta j$ is the polarization angle of the polarizing filter provided in the j-th aperture region.

As shown in FIG. 12, in the case where the sensitivities of the light transmitted through the aperture regions 14A to 14C are the same and the noise amount of the pixel signals $\alpha1$ to $\alpha4$ of the pixels P1 to P4 is 1, the noise amounts PV1 to PV3 of the image signals in the aperture regions 14A to 14C are PV1=2.75, PV2=3.00, and PV3=2.75, respectively.

Figure 13:
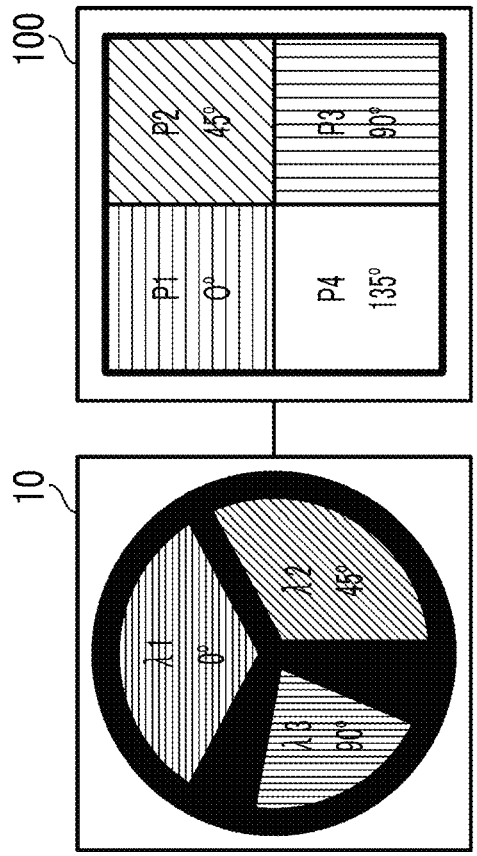
FIG. 13 is a diagram showing another example of calculating a noise amount.

FIG. 13 is a diagram showing another example of calculating a noise amount.

FIG. 13 shows an example of calculating a noise amount in a case where the sensitivities of the light transmitted through the aperture regions 14A to 14C are different. Specifically, a case where the sensitivity of the light transmitted through the third aperture region 14C is 40% of the sensitivity of the light transmitted through the other aperture region is shown as an example. In this case, as shown in FIG. 13, the noise amounts PV1 to PV3 of the image signals in the aperture regions 14A to 14C are PV1=2.30, PV2=2.40, and PV3=5.00, respectively, and the noise of the image signal in the third aperture region 14C, which has a relatively low sensitivity, increases.

[Optimization of Polarization Angle]

The polarization angles $\theta1$ to $\theta3$ of the polarizing filters 18A to 18C provided in the aperture regions 14A to 14C are adjusted to adjust the interference amount of the image signals in the aperture regions 14A to 14C, and the noise amount of the image in the aperture region having a relatively low sensitivity is reduced. Hereinafter, a method (setting method) for adjusting the polarization angles $\theta1$ to $\theta3$ will be described with reference to specific examples.

(1) Adjustment Example 1

Here, a case where the sensitivity of the light transmitted through the second aperture region 14B is 20% of the sensitivity of the light transmitted through the other aperture region will be described as an example. In this case, assuming that the sensitivity of the light transmitted through the first aperture region 14A and the third aperture region 14C is 1, the sensitivity of the light transmitted through the second aperture region 14B is 0.2. Further, between the aperture regions 14A to 14C, the relationship of the sensitivity of the light transmitted through the first aperture region=the sensitivity of the light transmitted through the third aperture region, the sensitivity of the light transmitted through the first aperture region>the sensitivity of the light transmitted through the second aperture region, and the sensitivity of the light transmitted through the third aperture region>the sensitivity of the light transmitted through the second aperture region is established. The sensitivity of the light transmitted through the first aperture region is synonymous with the sensitivity of light in the wavelength range $\lambda1$. The sensitivity of the light transmitted through the second aperture region is synonymous with the sensitivity of light in the wavelength range $\lambda2$. The sensitivity of the light transmitted through the third aperture region is synonymous with the sensitivity of light in the wavelength range $\lambda3$.

Figure 14:
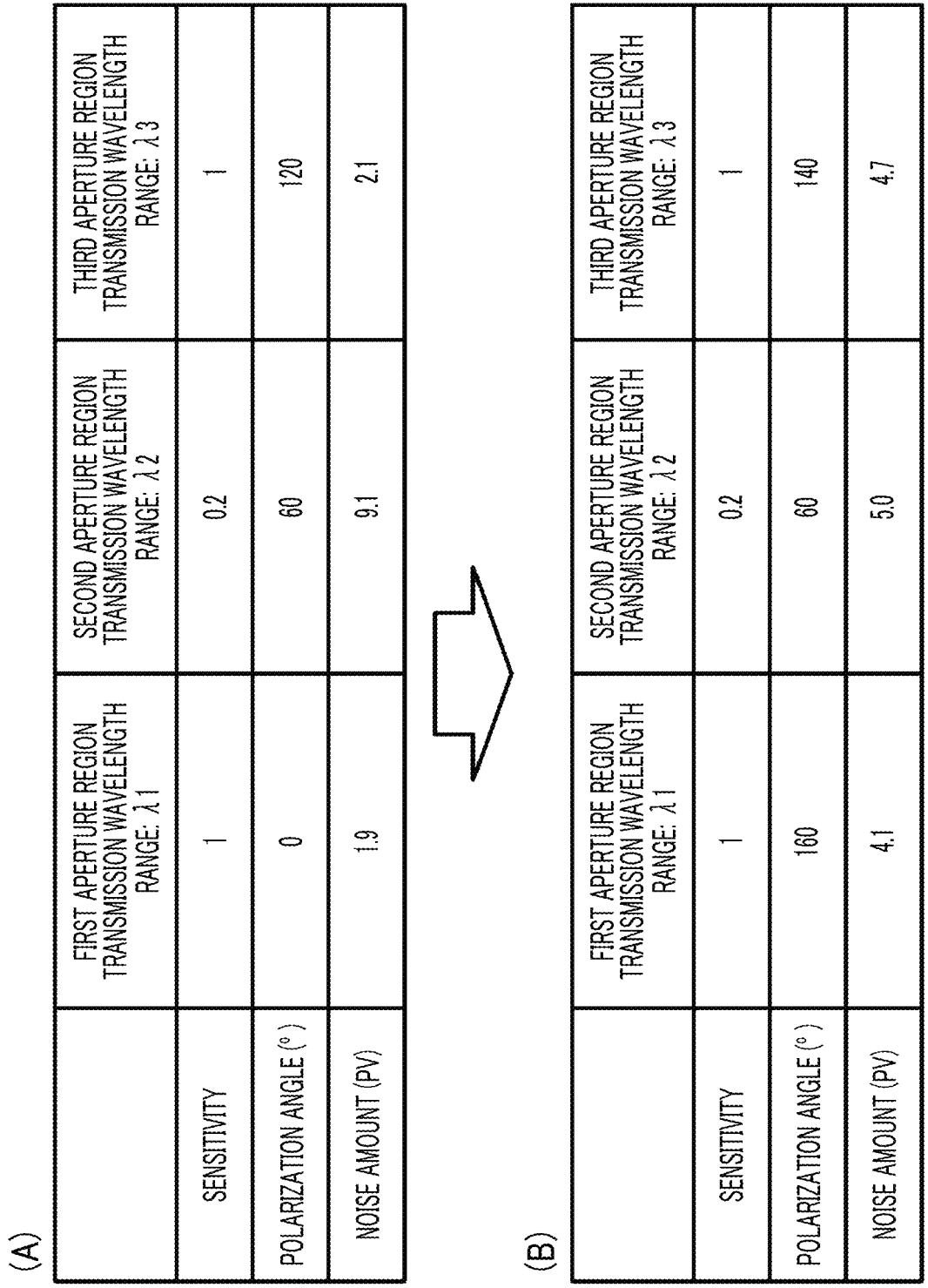
FIG. 14 illustrates tables showing an example of a method for adjusting a polarization angle.

FIG. 14 illustrates tables showing an example of a method for adjusting a polarization angle. Table (A) in FIG. 14 shows a comparative example, and Table (B) in FIG. 14 shows an adjustment example.

First, as a reference comparative example, noise amounts in a case where the polarization angles of the aperture regions 14A to 14C (the polarization angles of the polarizing filters 18A to 18C provided in the aperture regions 14A to 14C) $\theta1$ to $\theta3$ are set at equal intervals (the differences between adjacent polarizing filters are all equal in a case where the polarization angles of the polarizing filters provided in the aperture regions are arranged in angular order) are calculated. Here, the polarization angles $\theta1$ to $\theta3$ of the aperture regions 14A to 14C are set to $\theta1=0°$, $\theta2=60°$, and $\theta3=120°$. It is assumed that the polarization angles $\Theta1$ to $\Theta4$ of the pixels P1 to P4 of the image sensor 100 are set to $\Theta1=0°$, $\Theta2=45°$, $\Theta3=90°$, and $\Theta4=135°$.

Assuming that the noise amount of the pixel signals of the pixels P1 to P4 (noise amount of a so-called RAW image) is 1, the noise amounts PV1 to PV3 generated in the image signals in the aperture regions 14A to 14C are PV1=1.9, PV2=9.1, and PV3=2.1, respectively.

As shown in Table (A) of FIG. 14, in a case where the sensitivities of the light transmitted through the aperture regions 14A to 14C are different, if the polarization angles $\theta1$ to $\theta3$ of the aperture regions 14A to 14C are set at equal intervals, the noise of the image signal in the aperture region having a relatively low sensitivity increases. In the case of this example, the noise of the image signal in the second aperture region 14B increases.

In order to reduce the noise amount of the image signal in the aperture region having a relatively low sensitivity, the polarization angles $\theta1$ to $\theta3$ of the aperture regions 14A to 14C are adjusted as follows. That is, the polarization angles $\theta1$ to $\theta3$ of the aperture regions 14A to 14C are adjusted such that the amount of interference between the image signal in the aperture region having a relatively low sensitivity and the image signal in the other aperture region is reduced. Specifically, the polarization angle of the other aperture region is separated from the polarization angle of the aperture region having a relatively low sensitivity.

In the case of this example, the polarization angle $\theta1$ of the first aperture region 14A and the polarization angle $\theta3$ of the third aperture region 14C are separated from the polarization angle $\theta2$ of the second aperture region 14B. Specifically, the polarization angle $\theta1$ of the first aperture region 14A and the polarization angle $\theta3$ of the third aperture region 14C are shifted from the state of equal intervals in a direction away from the polarization angle $\theta2$ of the second aperture region 14B, respectively. Table (B) of FIG. 14 shows an example in the case of shifting from the state of equal intervals by 20°. As a result, the polarization angle $\theta1$ of the first aperture region 14A is set to 160° (=−20°), and the polarization angle $\theta3$ of the third aperture region 14C is set to 140°. By setting in this way, the noise amounts PV1 to PV3 generated in the image signals in the aperture regions 14A to 14C are PV1=4.1, PV2=5.0, and PV3=4.7, respectively, and the noise amount of the image signal in the second aperture region 14B is reduced as compared with the case of equal intervals. The noise amount of the image signals in the first aperture region 14A and the third aperture region 14C increases as compared with the case of equal intervals. This is because the adjustment reduces the separability between the image signal in the first aperture region 14A and the image signal in the third aperture region 14C (increases the interference amount). However, in a case where the generated image as a whole is viewed, noise is generated almost evenly, so that a more preferable image can be obtained. That is, since all of them are homogeneous images, a more preferable image (high-quality image as a whole) can be obtained as compared with the case where the quality is deteriorated only in a part of the images.

In the case of this example, the polarization angles θ1 to θ3 of the adjusted aperture regions 14A to 14C are θ1=160°, θ2=60°, and θ3=140°, as shown in Table (B) of FIG. 14. In this case, the difference between the adjacent polarization angles in a case where the polarization angles are arranged in angular order is |θ3−θ2|=80° and |θ1−θ3|=20°, which are different angle intervals.

(2) Adjustment Example 2

Here, a case where the sensitivity of the light transmitted through the first aperture region 14A and the third aperture region 14C is 20% of the sensitivity of the light transmitted through the second aperture region 14B will be described as an example. In this case, assuming that the sensitivity of the light transmitted through the second aperture region 14B is 1, the sensitivity of the light transmitted through the first aperture region 14A and the third aperture region 14C is 0.2. Further, between the aperture regions 14A to 14C, the relationship of the sensitivity of the light transmitted through the first aperture region=the sensitivity of the light transmitted through the third aperture region, the sensitivity of the light transmitted through the second aperture region>the sensitivity of the light transmitted through the first aperture region, and the sensitivity of the light transmitted through the second aperture region>the sensitivity of the light transmitted through the first aperture region is established.

Figure 15:
FIG. 15 illustrates tables showing an example of a method for adjusting a polarization angle.

FIG. 15 illustrates tables showing an example of a method for adjusting a polarization angle. Table (A) in FIG. 15 shows a comparative example, and Table (B) in FIG. 15 shows an adjustment example.

First, as a reference comparative example, noise amounts in a case where the polarization angles of the aperture regions 14A to 14C (the polarization angles of the polarizing filters 18A to 18C provided in the aperture regions 14A to 14C) θ1 to θ3 are set at equal intervals are calculated.

Assuming that the noise amount of the pixel signals of the pixels P1 to P4 is 1, the noise amounts PV1 to PV3 generated in the image signals in the aperture regions 14A to 14C are PV1=5.5, PV2=1.5, and PV3=6.1, respectively.

In the case of this example, as shown in Table (A) of FIG. 15, the noise of the image signals in the first aperture region 14A and the third aperture region 14C increases.

In order to reduce the noise amount of the image signal in the aperture region having a relatively low sensitivity, the polarization angles θ1 to θ3 of the aperture regions 14A to 14C are adjusted as follows. That is, the polarization angles of the aperture regions having a relatively low sensitivity are separated from each other. Specifically, by separating the polarization angle θ1 of the first aperture region 14A and the polarization angle θ3 of the third aperture region 14C from each other, the separability of the image signals in the first aperture region 14A and the third aperture region 14C having a relatively low sensitivity is improved, and the noise amount of the image signals in the first aperture region 14A and the third aperture region 14C having a relatively low sensitivity is reduced. In this case, the polarization angle θ1 of the first aperture region 14A and the polarization angle θ3 of the third aperture region 14C are adjusted in the direction approaching the polarization angle θ2 of the second aperture region 14B, respectively.

Table (B) of FIG. 15 shows an example in which the polarization angle θ1 of the first aperture region 14A and the polarization angle θ3 of the third aperture region 14C are each shifted by 10° from the state of equal intervals. In this case, the polarization angle θ1 of the first aperture region 14A is set to 10°, and the polarization angle θ3 of the third aperture region 14C is set to 110°. By setting in this way, the noise amounts PV1 to PV3 generated in the image signals in the aperture regions 14A to 14C are PV1=5.10, PV2=1.78, and PV3=5.58, respectively, and the noise amount of the image signals in the first aperture region 14A and the third aperture region 14C is reduced as compared with the case of equal intervals. Further, as a result, the difference in the amount of noise between the images is reduced, and a more preferable image can be obtained as a whole.

(3) Adjustment Example 3

Here, a case where the sensitivity of the light transmitted through the first aperture region 14A is 50% of the sensitivity of the light transmitted through the second aperture region 14B and the sensitivity of the light transmitted through the third aperture region 14C is 20% of the sensitivity of the light transmitted through the second aperture region 14B will be described as an example. In this case, assuming that the sensitivity of the light transmitted through the second aperture region 14B is 1, the sensitivity of the light transmitted through the first aperture region 14A is 0.5 and the sensitivity of the light transmitted through the third aperture region 14C is 0.2. Further, between the aperture regions 14A to 14C, the relationship of the sensitivity of the light transmitted through the second aperture region>the sensitivity of the light transmitted through the first aperture region>the sensitivity of the light transmitted through the third aperture region is established.

FIG. 16 illustrates tables showing an example of a method for adjusting a polarization angle. Table (A) in FIG. 16 shows a comparative example, and Table (B) in FIG. 16 shows an adjustment example.

First, as a reference comparative example, noise amounts in a case where the polarization angles of the aperture regions 14A to 14C (the polarization angles of the polarizing filters 18A to 18C provided in the aperture regions 14A to 14C) θ1 to θ3 are set at equal intervals are calculated.

Assuming that the noise amount of the pixel signals of the pixels P1 to P4 is 1, the noise amounts PV1 to PV3 generated in the image signals in the aperture regions 14A to 14C are PV1=2.8, PV2=1.7, and PV3=7.2, respectively.

In the case of this example, as shown in Table (A) of FIG. 16, the noise of the image signal in the third aperture region 14C having a relatively low sensitivity increases.

In order to reduce the noise amount of the image signal in the aperture region having a relatively low sensitivity, the polarization angles θ1 to θ3 of the aperture regions 14A to 14C are adjusted as follows. That is, by separating the polarization angle of the other aperture region from the polarization angle of the aperture region having a relatively low sensitivity, the separability of the image signal in the aperture region having a relatively low sensitivity is improved, and the noise amount of the image signal in the aperture region having a relatively low sensitivity is reduced. In this example, the polarization angle θ1 of the first aperture region 14A and the polarization angle θ2 of the second aperture region 14B are brought close to each other. Thus, the separability of the image signal in the first aperture region 14A and the image signal in the second aperture region 14B is lowered, while the separability of the image signal in the third aperture region 14C is improved, and the noise amount of the image signal in the third aperture region 14C having a relatively low sensitivity is reduced.

Table (B) of FIG. 16 shows an example in which the polarization angle θ1 of the first aperture region 14A is shifted by 30° in the direction approaching the polarization angle θ2 of the second aperture region 14B from the state of equal intervals. In this case, the polarization angle θ1 of the first aperture region 14A is set to 30°. By setting in this way, the noise amounts PV1 to PV3 generated in the image signals in the aperture regions 14A to 14C are PV1=4.1, PV2=2.7, and PV3=5.6, respectively, and the noise amount of the image signal in the third aperture region 14C is reduced as compared with the case of equal intervals. Further, as a result, the difference in the amount of noise between the images is reduced, and a more preferable image can be obtained as a whole.

Figure 17:
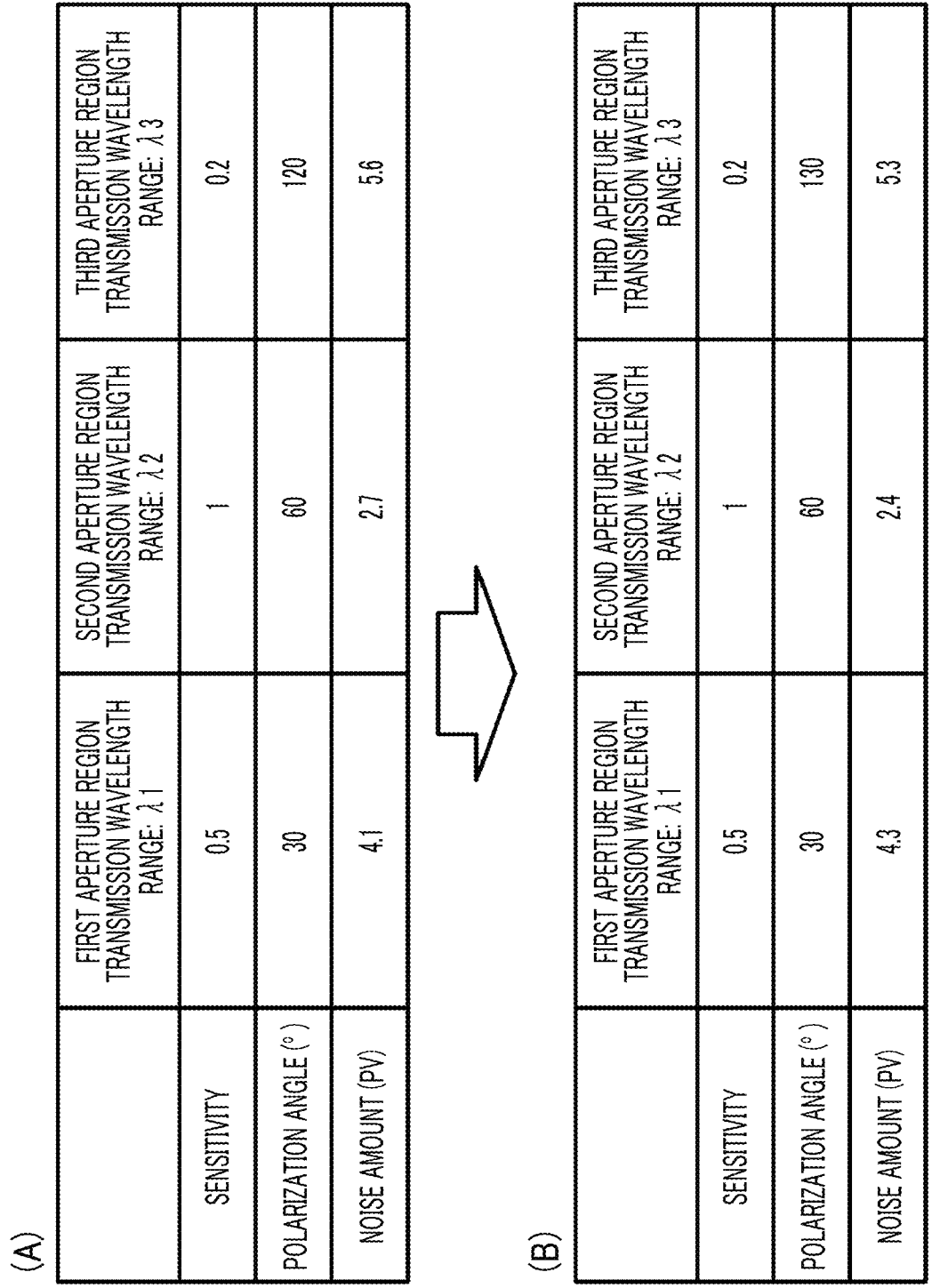
FIG. 17 illustrates tables showing another example of a method for adjusting a polarization angle.

FIG. 17 illustrates tables showing another example of a method for adjusting a polarization angle. FIG. 17 shows an example of a case where further adjustment is made from the above adjustment (adjustment described with reference to FIG. 16). Table (A) in FIG. 17 shows the state after the above adjustment. In addition, Table (B) in FIG. 17 shows the state after further adjustment.

In the case where further adjustment is made, as shown in Table (B), the polarization angle θ2 of the second aperture region 14B and the polarization angle θ3 of the third aperture region 14C are separated from each other. Note that Table (B) shows an example in which the polarization angle θ3 of the third aperture region 14C is shifted by 10° in the direction away from the polarization angle θ2 of the second aperture region 14B. In this case, the polarization angle θ3 of the third aperture region 14C is set to 130°. By setting in this way, the noise amounts PV1 to PV3 generated in the image signals in the aperture regions 14A to 14C are PV1=4.3, PV2=2.4, and PV3=5.3, respectively, and further, the noise amount of the image signal in the third aperture region 14C is reduced.

As described above, the polarization angle of each aperture region is adjusted and set based on the sensitivity of the light transmitted through each aperture region. At that time, the polarization angle of each aperture region is set such that the difference in the noise amount of the image signal in each aperture region is smaller than in the case of equal intervals (case where all the differences are equal). Preferably, the polarization angle is set to minimize the difference in the noise amount of the image signal in each aperture region. Note that, the "minimization" here includes a case where it can be regarded as a substantially minimized state, that is, an almost minimum state.

In order to set the difference in the noise amount of the image signals in each aperture region to be smaller than in the case of equal intervals, the amount of noise amplification due to the interference removal processing is set to be smaller than in the case of equal intervals. To this end, the polarization angle of each aperture region is set such that the amount of interference between the image signal in the aperture region having a relatively low sensitivity and the image signal in the other aperture region is reduced. Note that, preferably, the polarization angle of each aperture region is set such that the amount of noise amplification due to the interference removal processing is minimized (including almost the minimum).

[Other Noise Evaluation Methods]

The noise generated in the images of the aperture regions 14A to 14C (images of the wavelength ranges λ1 to λ3) after the interference removal processing can be evaluated by the standard deviation (STD), the number of conditions of the interference matrix B, and the like.

The evaluation value of noise due to the standard deviation can be calculated by, for example, the following method. First, as an initial value, the noise of the pixel signals of the pixels P1 to P4 of the image sensor is set (for example, a random number of ±1), and the noise is multiplied by the interference removal matrix to calculate a noise value of the image signals in the aperture regions 14A to 14C. Further, the above calculation is performed a plurality of times (for example, 100 times) while changing the initial value with a random number or the like. Thus, a plurality of (for example, 100) noise values of the image signals in each of the aperture regions 14A to 14C can be obtained. The standard deviations of the plurality of obtained noise values are calculated, and the evaluation values of noise are calculated.

FIG. 18 is a diagram showing an example of a calculation result of an evaluation value of noise in each noise evaluation method.

In this example, the evaluation value of noise is calculated by changing only the sensitivity without changing the setting of the polarization angle of each aperture region. The polarization angle of each aperture region is set such that the polarization angle θ1 of the first aperture region is θ1=0°, the polarization angle θ2 of the second aperture region is θ2=60°, and the polarization angle θ3 of the third aperture region is θ3=120°. That is, they are set at equal intervals.

In the table shown in FIG. 18, A shows the calculation result in a case where the sensitivity of the light transmitted through the first aperture region is 1, the sensitivity of the light transmitted through the second aperture region is 1, and the sensitivity of the light transmitted through the third aperture region is 1. That is, the calculation result of the evaluation value of noise in a case where the sensitivities of the light transmitted through each aperture region are all the same is shown. B shows the calculation result in a case where the sensitivity of the light transmitted through the first aperture region is 1, the sensitivity of the light transmitted through the second aperture region is 0.5, and the sensitivity of the light transmitted through the third aperture region is 0.5. C shows the calculation result in a case where the sensitivity of the light transmitted through the first aperture region is 1, the sensitivity of the light transmitted through the second aperture region is 0.5, and the sensitivity of the light transmitted through the third aperture region is 0.25. D shows the calculation result in a case where the sensitivity of the light transmitted through the first aperture region is 1, the sensitivity of the light transmitted through the second aperture region is 0.5, and the sensitivity of the light transmitted through the third aperture region is 0.1.

[Optimization Method of Polarization Angle Based on Evaluation Value of Noise Obtained by Each Evaluation Method]

(1) Method for Adjusting Polarization Angle in Case Where Noise is Evaluated by Standard Deviation In a case where the noise is evaluated by the standard deviation, the polarization angle of each aperture region can be optimized by the same method as the case where the polarization angle is set based on the noise amount PV. Specifically, the polarization angle of each aperture region is set based on the sensitivity of the light transmitted through each aperture region, and the polarization angle of each aperture region is set such that the amount of interference between the image signal in the aperture region having a relatively low sensitivity and the image signal in the other aperture region is reduced. At that time, the polarization angle of each aperture region is set such that the difference in the noise amount (evaluation value of noise) of the image signal in each aperture region is smaller than in the case of equal intervals (case where all the differences are equal). Preferably, the polarization angle of each aperture region is set such that the difference in the noise amount of the image signal in each aperture region is minimized (including the case where it is almost minimized). Thus, the noise amount of the image in the aperture region having a relatively low sensitivity is reduced, and a high-quality image (multispectral image) as a whole can be generated as a whole.

(2) Method for Adjusting Polarization Angle in Case Where Noise is Evaluated by Number of Conditions of Interference Matrix In a case where the noise is evaluated by the number of conditions of the interference matrix B, the polarization angle of each aperture region is set such that the number of conditions is lower than in the case of equal intervals. Preferably, the polarization angle of each aperture region is set such that the number of conditions of the interference matrix B is minimized (including the case where it is almost minimized).

The number of conditions of the interference matrix B is an index showing the noise amount in various subjects and conditions. Therefore, by reducing the number of conditions of the interference matrix B, the noise amount can be reduced and a high-quality multispectral image can be generated.

By reducing the number of aperture regions used to calculate the number of conditions, it is also possible to optimize (reduce noise) only the image of a specific aperture region (image of the wavelength range).

[Adjustment Example]

(1) Adjustment Example 1

FIG. 19 is a diagram showing an example of adjusting a polarization angle based on each noise evaluation method.

FIG. 19 shows an adjustment example in a case where the sensitivity of the light transmitted through the first aperture region is 1, the sensitivity of the light transmitted through the second aperture region is 0.5, and the sensitivity of the light transmitted through the third aperture region is 0.25. That is, an adjustment example in the case of C in the table of FIG. 18 is shown. In either case, an example is shown in which the polarization angle θ2 of the second aperture region 14B and the polarization angle θ3 of the third aperture region 14C are adjusted to optimize the polarization angle set in each aperture region.

In the table shown in FIG. 19, C1 shows an example in which the polarization angle of each aperture region is adjusted based on the evaluation value of noise due to the standard deviation. That is, an example is shown in which adjustment is made such that the difference in the evaluation value of noise due to the standard deviation is reduced.

In the table shown in FIG. 19, C2 shows an example in which the polarization angle of each aperture region is adjusted based on the number of conditions of the interference matrix B. That is, an example is shown in which adjustment is made such that the number of conditions of the interference matrix B is reduced.

In the table shown in FIG. 19, C3 shows an example in which the polarization angle of each aperture region is adjusted based on the noise amount PV. That is, an example is shown in which adjustment is made such that the noise amount PV is reduced.

In either case, the difference in noise between the images is reduced, and a preferable image (multispectral image) as a whole can be generated.

As shown in FIG. 19, as a result of the adjustment, the polarization angles set in each aperture region are not at equal intervals. That is, in a case where the polarization angles set in each aperture region are in the order of the polarization angles, at least one of the differences in the adjacent polarization angles is different from the others.

Figure 20:
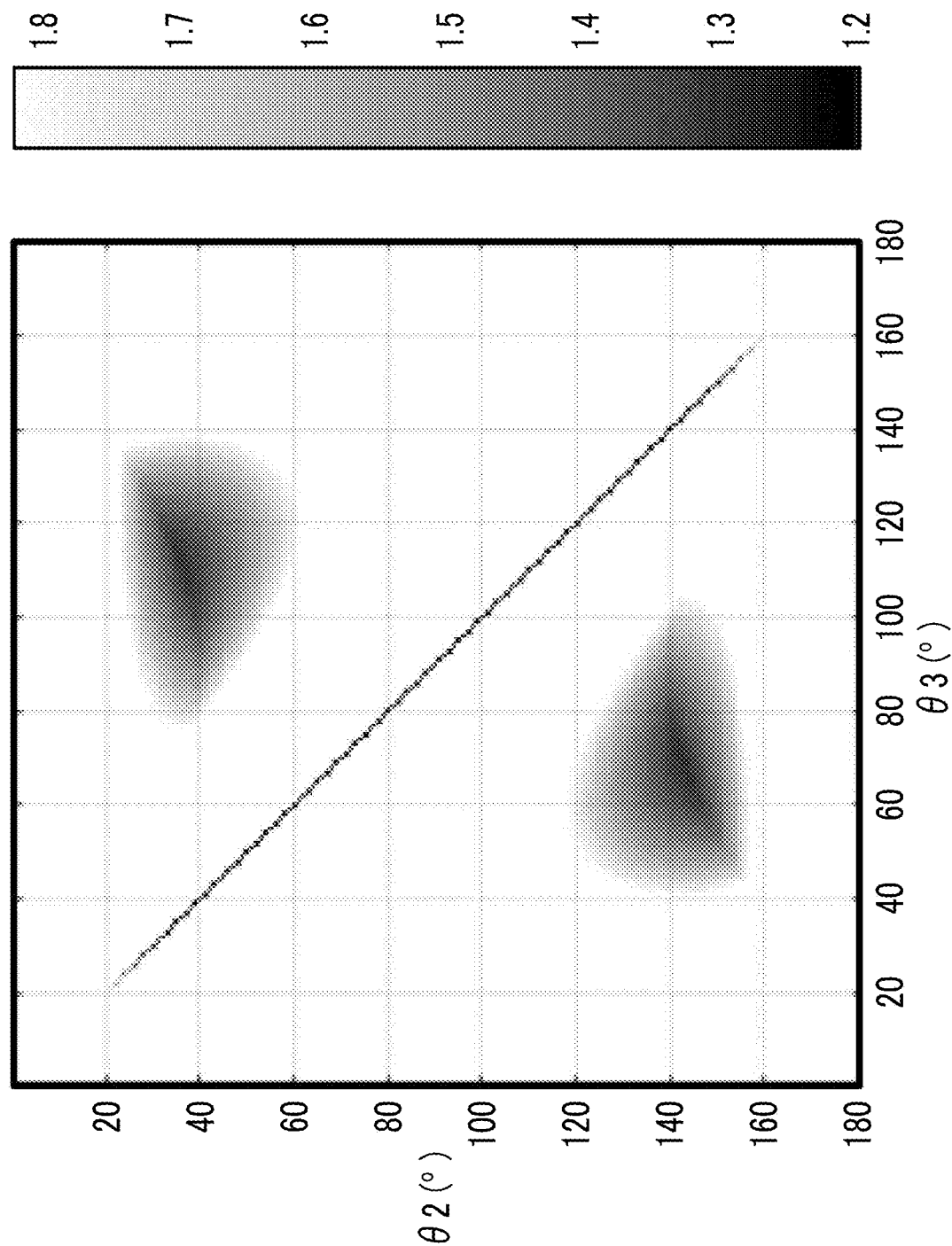
FIG. 20 is a graph showing a fluctuation state of an evaluation value of noise due to a standard deviation.

FIG. 20 is a graph showing a fluctuation state of an evaluation value of noise due to a standard deviation.

FIG. 20 shows, in the case where the sensitivity of the light transmitted through the first aperture region is 1, the sensitivity of the light transmitted through the second aperture region is 0.5, and the sensitivity of the light transmitted through the third aperture region is 0.25, a fluctuation state of the evaluation value of noise in a case where the polarization angles θ2 and θ3 of the second aperture region and the third aperture region are changed, with the case of equal intervals (case of θ1=0°, θ2=60°, and θ3=120°) as the initial value.

In the graph shown in FIG. 20, the colorless (same color as the background) region is a region under the condition that noise equal to or higher than the initial value (θ1=0°, θ2=60°, and θ3=120°) is generated. On the other hand, the colored region is a region under the condition that the noise is reduced from the initial value. The colored region is a region under the condition that noise is reduced as the density is higher. Therefore, by selecting at least the conditions of the colored region, it is possible to reduce the noise generated as compared with the case of equal intervals.

Figure 21:
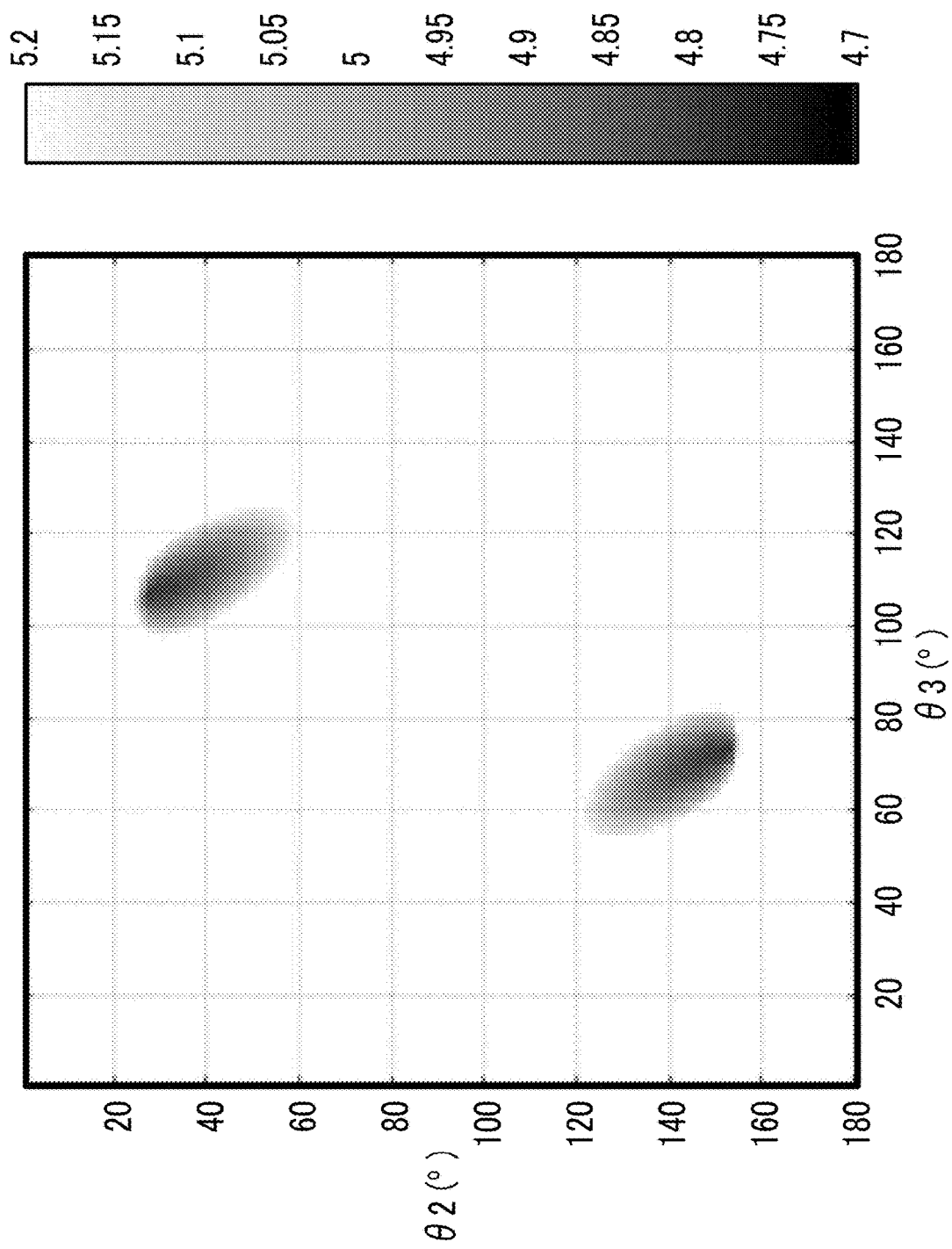
FIG. 21 is a graph showing a fluctuation state of the number of conditions of an interference matrix.

FIG. 21 is a graph showing a fluctuation state of the number of conditions of an interference matrix.

FIG. 21 shows, in the case where the sensitivity of the light transmitted through the first aperture region is 1, the sensitivity of the light transmitted through the second aperture region is 0.5, and the sensitivity of the light transmitted through the third aperture region is 0.25, a fluctuation state of the number of conditions in a case where the polarization angles θ2 and θ3 of the second aperture region and the third aperture region are changed, with the case of equal intervals as the initial value.

In the graph shown in FIG. 21, the colorless region is a region under the condition that noise equal to or higher than the initial value is generated. On the other hand, the colored region is a region under the condition that the noise is reduced from the initial value, and a region under the condition that noise is reduced as the density is higher. Therefore, by selecting at least the conditions of the colored region, it is possible to reduce the noise generated as compared with the case of equal intervals.

Figure 22:
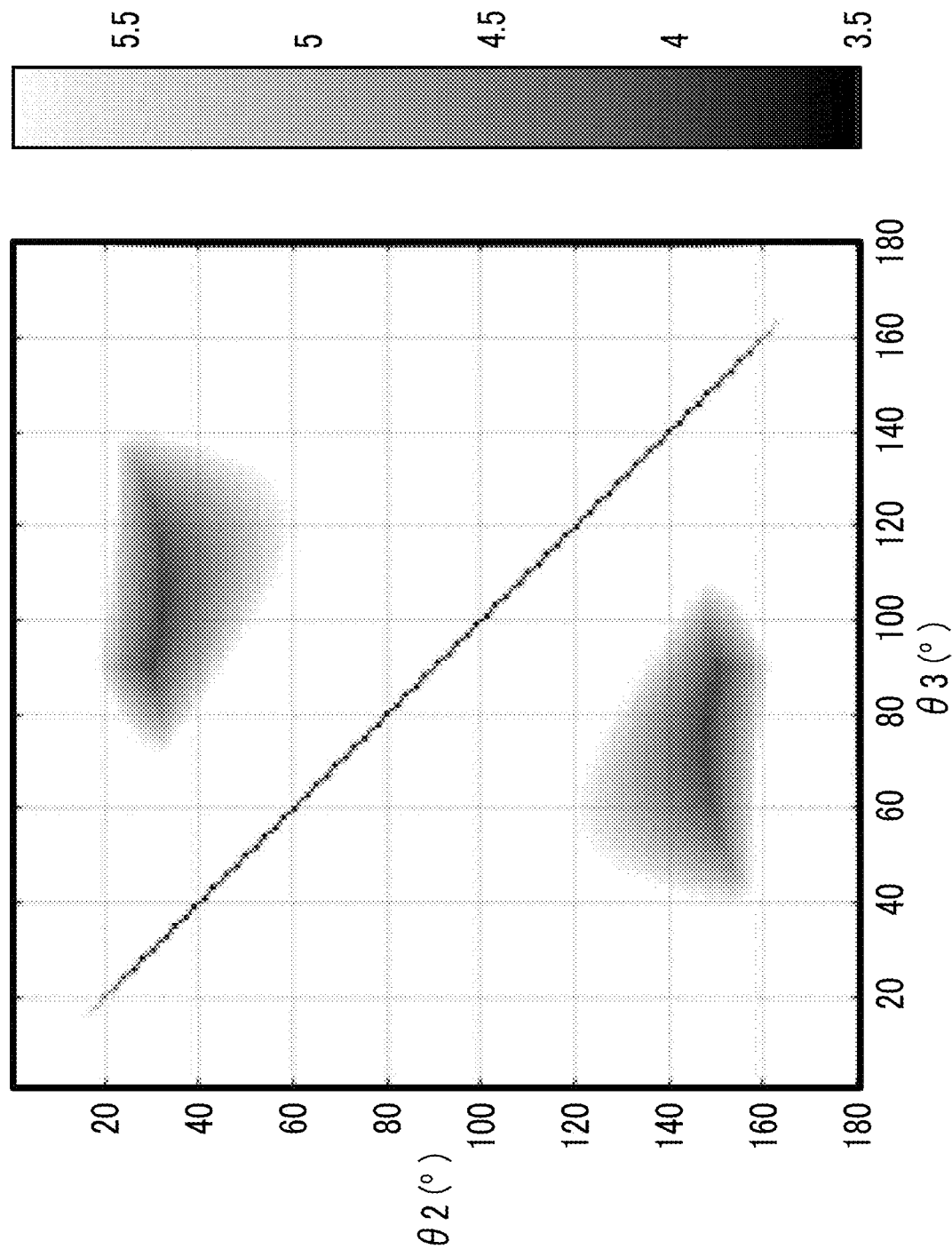
FIG. 22 is a graph showing a fluctuation state of a noise amount.

FIG. 22 is a graph showing a fluctuation state of a noise amount.

FIG. 22 shows, in the case where the sensitivity of the light transmitted through the first aperture region is 1, the sensitivity of the light transmitted through the second aperture region is 0.5, and the sensitivity of the light transmitted through the third aperture region is 0.25, a fluctuation state of the noise amount PV in a case where the polarization angles θ2 and θ3 of the second aperture region and the third aperture region are changed, with the case of equal intervals as the initial value.

In the graph shown in FIG. 22, the colorless region is a region under the condition that noise equal to or higher than the initial value is generated. On the other hand, the colored region is a region under the condition that the noise is reduced from the initial value, and a region under the condition that noise is reduced as the density is higher. Therefore, by selecting at least the conditions of the colored region, it is possible to reduce the noise generated as compared with the case of equal intervals.

(2) Adjustment Example 2

FIG. 23 is a diagram showing another example of adjusting a polarization angle based on each noise evaluation method.

FIG. 23 shows an adjustment example in a case where the sensitivity of the light transmitted through the first aperture region is 1, the sensitivity of the light transmitted through the second aperture region is 0.5, and the sensitivity of the light transmitted through the third aperture region is 0.1. That is, an adjustment example in the case of D in the table of FIG. 18 is shown. In either case, an example is shown in which the polarization angle θ2 of the second aperture region 14B and the polarization angle θ3 of the third aperture region 14C are adjusted to optimize the polarization angle set in each aperture region.

In the table shown in FIG. 23, D1 shows an example in which the polarization angle of each aperture region is adjusted based on the evaluation value of noise due to the standard deviation. That is, an example is shown in which adjustment is made such that the difference in the evaluation value of noise due to the standard deviation is reduced.

In the table shown in FIG. 19, D2 shows an example in which the polarization angle of each aperture region is adjusted based on the number of conditions of the interference matrix B. That is, an example is shown in which adjustment is made such that the number of conditions of the interference matrix B is reduced.

In the table shown in FIG. 19, D3 shows an example in which the polarization angle of each aperture region is adjusted based on the noise amount PV. That is, an example is shown in which adjustment is made such that the noise amount PV is reduced.

In either case, the difference in noise between the images is reduced, and a preferable image (multispectral image) as a whole can be generated.

As shown in FIG. 23, as a result of the adjustment, the polarization angles set in each aperture region are not at equal intervals. That is, in a case where the polarization angles set in each aperture region are in the order of the polarization angles, at least one of the differences in the adjacent polarization angles is different from the others.

Figure 24:
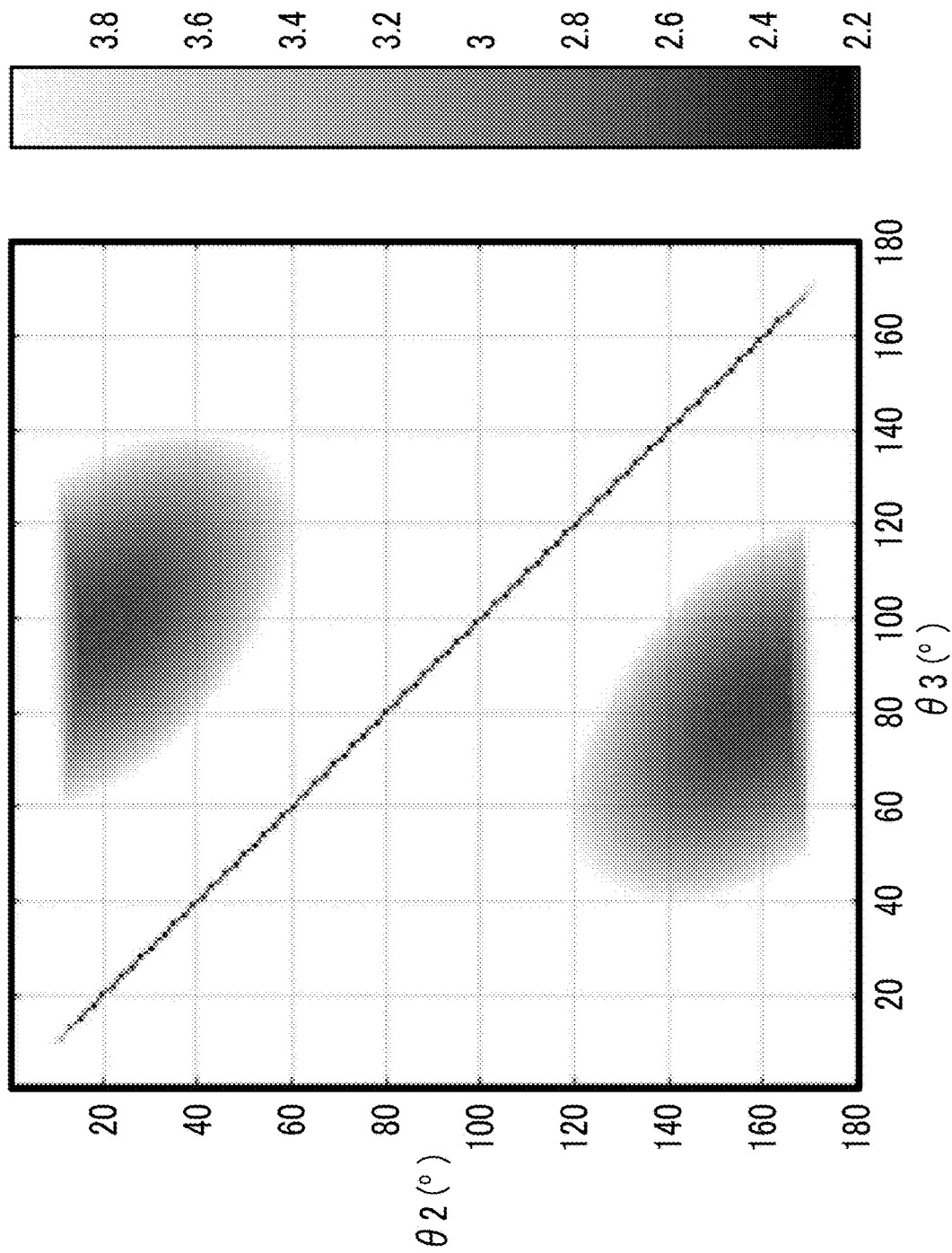
FIG. 24 is a graph showing a fluctuation state of an evaluation value of noise due to a standard deviation.

FIG. 24 is a graph showing a fluctuation state of an evaluation value of noise due to a standard deviation.

FIG. 24 shows, in the case where the sensitivity of the light transmitted through the first aperture region is 1, the sensitivity of the light transmitted through the second aperture region is 0.5, and the sensitivity of the light transmitted through the third aperture region is 0.1, a fluctuation state of the evaluation value of noise in a case where the polarization angles θ2 and θ3 of the second aperture region and the third aperture region are changed, with the case of equal intervals (case of θ1=0°, θ2=60°, and θ3=120°) as the initial value.

In the graph shown in FIG. 24, the colorless (same color as the background) region is a region under the condition that noise equal to or higher than the initial value (θ1=0°, θ2=60°, and θ3=120°) is generated. On the other hand, the colored region is a region under the condition that the noise is reduced from the initial value, and a region under the condition that noise is reduced as the density is higher. Therefore, by selecting at least the conditions of the colored region, it is possible to reduce the noise generated as compared with the case of equal intervals.

Figure 25:
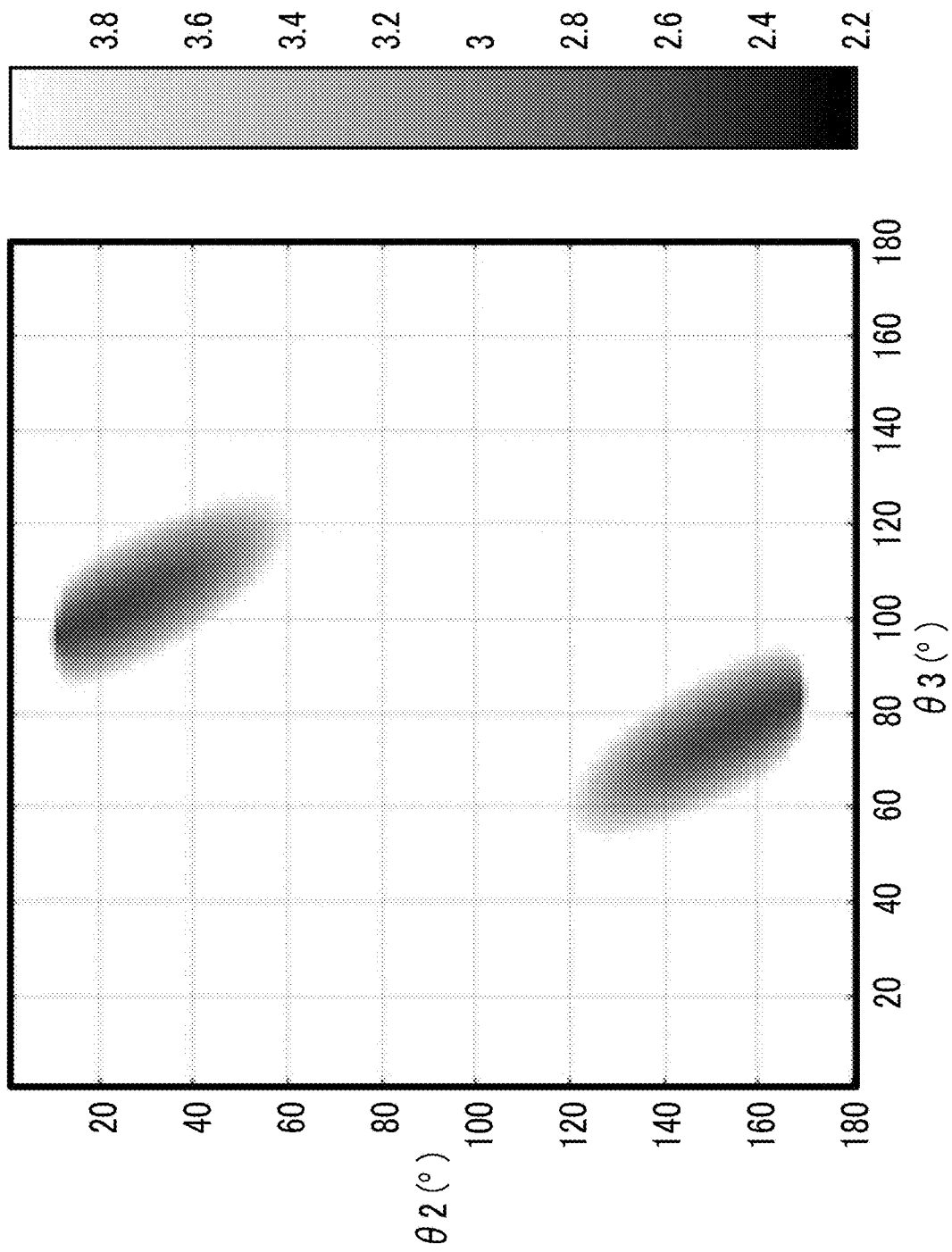
FIG. 25 is a graph showing a fluctuation state of the number of conditions of an interference matrix.

FIG. 25 is a graph showing a fluctuation state of the number of conditions of an interference matrix.

FIG. 25 shows, in the case where the sensitivity of the light transmitted through the first aperture region is 1, the sensitivity of the light transmitted through the second aperture region is 0.5, and the sensitivity of the light transmitted through the third aperture region is 0.1, a fluctuation state of the number of conditions in a case where the polarization angles θ2 and θ3 of the second aperture region and the third aperture region are changed, with the case of equal intervals as the initial value.

In the graph shown in FIG. 25, the colorless region is a region under the condition that noise equal to or higher than the initial value is generated. On the other hand, the colored region is a region under the condition that the noise is reduced from the initial value, and a region under the condition that noise is reduced as the density is higher. Therefore, by selecting at least the conditions of the colored region, it is possible to reduce the noise generated as compared with the case of equal intervals.

Figure 26:
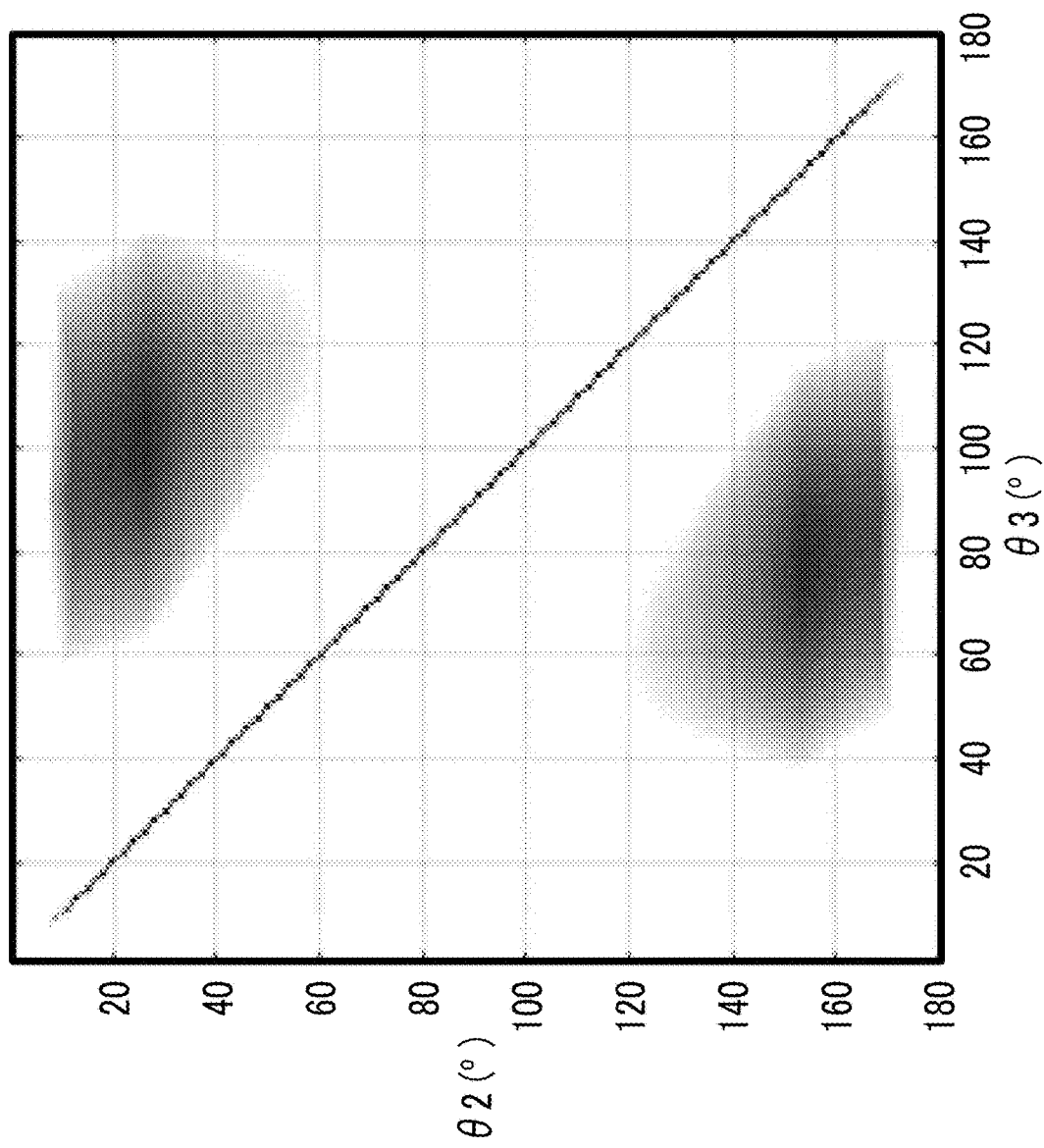
FIG. 26 is a graph showing a fluctuation state of a noise amount.

FIG. 26 is a graph showing a fluctuation state of a noise amount.

FIG. 26 shows, in the case where the sensitivity of the light transmitted through the first aperture region is 1, the sensitivity of the light transmitted through the second aperture region is 0.5, and the sensitivity of the light transmitted through the third aperture region is 0.1, a fluctuation state of the noise amount PV in a case where the polarization angles θ2 and θ3 of the second aperture region and the third aperture region are changed, with the case of equal intervals as the initial value.

In the graph shown in FIG. 26, the colorless region is a region under the condition that noise equal to or higher than the initial value is generated. On the other hand, the colored region is a region under the condition that the noise is reduced from the initial value. The colored region is a region under the condition that noise is reduced as the density is higher. Therefore, by selecting at least the conditions of the colored region, it is possible to reduce the noise generated as compared with the case of equal intervals.

Other Embodiments

[Modification Example of Imaging Apparatus]

Although the case where the present invention is applied to an imaging apparatus that divides the pupil region of an imaging lens into three regions and captures a multispectral image in three wavelength ranges has been described as an example in the above embodiment, the application of the present invention is not limited thereto. It can be applied to an imaging apparatus that divides the pupil region of an imaging lens into three or more regions and captures a multispectral image in three or more wavelength ranges.

Further, each pixel of the image sensor may be provided with a spectral filter element. A plurality of types of spectral filter elements may be used. By using a plurality of types of spectral filter elements, each pixel can receive light having a different combination of a spectral sensitivity and a polarization angle. Thereby, more multispectral images can be captured.

Figure 27:
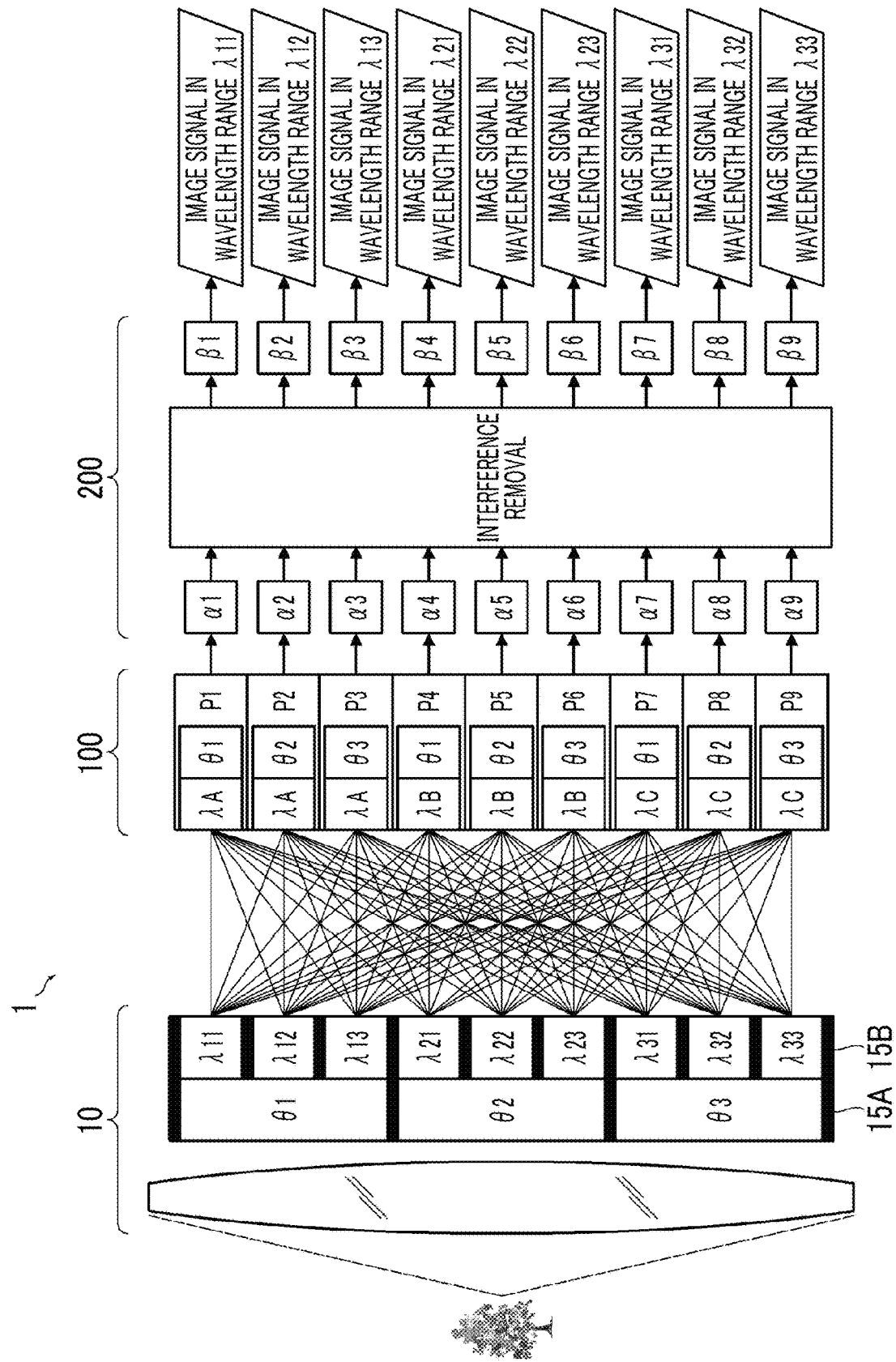
FIG. 27 is a conceptual diagram showing an example of an imaging apparatus that captures a multispectral image in nine wavelength ranges.

FIG. 27 is a conceptual diagram showing an example of an imaging apparatus that captures a multispectral image in nine wavelength ranges.

As shown in FIG. 27, the imaging lens 10 of this example is provided with a first aperture plate 15A and a second aperture plate 15B. The first aperture plate 15A and the second aperture plate 15B are disposed at a pupil position of the imaging lens 10 or near the pupil position.

The first aperture plate 15A is provided with three aperture regions. A first aperture region is provided with a first polarizing filter that transmits light having a polarization angle θ1. A second aperture region is provided with a second polarizing filter that transmits light having a polarization angle θ2. A third aperture region is provided with a third polarizing filter that transmits light having a polarization angle θ3.

The second aperture plate 15B is provided with nine aperture regions. A first aperture region is provided with a first bandpass filter that transmits light in a wavelength range λ11. A second aperture region is provided with a second bandpass filter that transmits light in a wavelength range λ12. A third aperture region is provided with a third bandpass filter that transmits light in a wavelength range λ13. A fourth aperture region is provided with a fourth bandpass filter that transmits light in a wavelength range λ21. A fifth aperture region is provided with a fifth bandpass filter that transmits light in a wavelength range λ22. A sixth aperture region is provided with a sixth bandpass filter that transmits light in a wavelength range λ23. A seventh aperture region is provided with a seventh bandpass filter that transmits light in a wavelength range λ31. An eighth aperture region is provided with an eighth bandpass filter that transmits light in a wavelength range λ32. A ninth aperture region is provided with a ninth bandpass filter that transmits light in a wavelength range λ33.

The first to third aperture regions of the second aperture plate 15B communicate with the first aperture region of the first aperture plate 15A. Therefore, light having a polarization angle θ1 is incident on the first to third aperture regions of the second aperture plate 15B. The fourth to sixth aperture regions of the second aperture plate 15B communicate with the second aperture region of the first aperture plate 15A. Therefore, light having a polarization angle θ2 is incident on the fourth to sixth aperture regions of the second aperture plate 15B. The seventh to ninth aperture regions of the second aperture plate 15B communicate with the third aperture region of the first aperture plate 15A. Therefore, light having a polarization angle θ3 is incident on the seventh to ninth aperture regions of the second aperture plate 15B.

With the imaging lens 10 having the above configuration, the pupil region is divided into nine regions, and each region transmits light having a combination of a different polarization angle and a different wavelength range.

In the image sensor 100, one pixel block is composed of nine pixels P1 to P9. Each of the pixels P1 to P9 is provided with a different combination of a polarizing filter element and a spectral filter element. Specifically, the first pixel P1 is provided with a polarizing filter element having a polarization angle Θ1 and a spectral filter element having a spectral sensitivity λA (for example, a spectral filter element having a spectral sensitivity peak in a red wavelength range). The second pixel P2 is provided with a polarizing filter element having a polarization angle Θ2 and a spectral filter element having a spectral sensitivity λA. The third pixel P3 is provided with a polarizing filter element having a polarization angle Θ3 and a spectral filter element having a spectral sensitivity λA. The fourth pixel P4 is provided with a polarizing filter element having a polarization angle Θ1 and a spectral filter element having a spectral sensitivity λB (for example, a spectral filter element having a spectral sensitivity peak in a green wavelength range). The fifth pixel P5 is provided with a polarizing filter element having a polarization angle Θ2 and a spectral filter element having a light sensitivity λB. The sixth pixel P6 is provided with a polarizing filter element having a polarization angle Θ3 and a spectral filter element having a spectral sensitivity λB. The seventh pixel P7 is provided with a polarizing filter element having a polarization angle Θ1 and a spectral filter element having a spectral sensitivity λC (for example, a spectral filter element having a spectral sensitivity peak in a blue wavelength range). The eighth pixel P8 is provided with a polarizing filter element having a polarization angle Θ2 and a spectral filter element having a spectral sensitivity λC. The ninth pixel P9 is provided with a polarizing filter element having a polarization angle Θ3 and a spectral filter element having a spectral sensitivity λC. That is, three types of polarizing filter elements and three types of spectral filter elements are combined, and each pixel is provided with a polarizing filter element and a spectral filter element.

With the image sensor 100 having the above configuration, in each pixel block, each of the pixels P1 to P9 receives light having a different polarization angle and a different spectral sensitivity.

The signal processing unit 200 processes the signal output from the image sensor 100 to generate an image signal in each of the wavelength ranges λ11 to λ33. Specifically, interference removal processing is performed to generate image signals in each of the wavelength ranges λ11 to λ33.

In the imaging apparatus 1 of this example, the imaging lens 10 is provided with three types of polarizing filters. For these three types of polarizing filters, the polarization angle is optimized by the method described in the above embodiment. By optimizing the polarization angle, it is possible to capture a good image (multispectral image) with suppressed noise. For example, the polarization angle of each polarizing filter is set such that the number of conditions of the interference matrix is minimized.

[Modification Example of Imaging Lens]

The imaging lens of the above embodiment has a configuration in which a polarizing filter and a bandpass filter are provided in one aperture plate, but a polarizing filter and a bandpass filter may be provided in separate polarizing plates.

Further, the imaging lens of the above embodiment is provided with a plurality of aperture regions obtained by equally dividing the disk-shaped aperture plate in the circumferential direction, but the shape and layout of the aperture regions are not limited thereto. As for the shape and layout of the aperture regions, the optimum shape and layout can be selected according to the number of aperture regions, the imaging target, and the like.

[Adjustment Mechanism]

As described above, in a case where the interference removal processing is performed to generate an image of each aperture region, the noise amount of each image is determined by the "sensitivity of the light transmitted through each aperture region" and the "amount of noise amplification due to the interference removal processing".

The "sensitivity of the light transmitted through each aperture region" varies depending on the light source and the subject. Therefore, it is preferable to have a configuration in which the polarizing filter used can be appropriately replaced depending on the light source and the subject. Therefore, it is preferable that the imaging lens 10 is provided with a polarizing filter replacement mechanism.

The polarizing filter replacement mechanism may have a configuration in which the entire unit is replaced, or a configuration in which each polarizing filter is replaced individually. In the case of replacing the entire unit, a plurality of units with different combinations of polarizing filters are prepared, and the unit to be used is replaced as appropriate according to the situation (light source and subject).

It is preferable that the bandpass filter is similarly provided with a replacement mechanism. In this case, as in the case of the polarizing filter, the entire unit may be replaced, or each bandpass filter may be able to be replaced individually.

Further, the imaging lens may be provided with a mechanism for changing the combination of the bandpass filter and the polarizing filter in each aperture region. For example, a structure in which at least one of the bandpass filter or the polarizing filter rotates (rotational structure) may be employed, and a structure in which at least one of the bandpass filter or the polarizing filter is rotated to change the combination of the bandpass filter and the polarizing filter may be employed. Specifically, a bandpass filter and a polarizing filter are attached to separate aperture plates such that at least one of the aperture plates can rotate about the optical axis. Thereby, the combination of the bandpass filter and the polarizing filter can be changed by rotating the aperture plate (so-called turret-shaped switching mechanism).

In this case, if the polarizing filter side is fixed and the bandpass filter side can be rotated, it is more preferable because it is not necessary to change the parameters for removing interference according to the rotation.

[Presentation of Information]

As described above, the "sensitivity of the light transmitted through each aperture region" varies depending on the light source and the subject. Therefore, it is possible to present the optimum polarizing filter to the user according to the light source and the subject. In this case, the noise amount is measured from each image (multi spectral image) obtained by imaging, and a polarizing filter (polarization angle) at which noise is further reduced is presented. For example, a combination of polarizing filters that further reduces noise is displayed on a display or the like.

Figure 28:
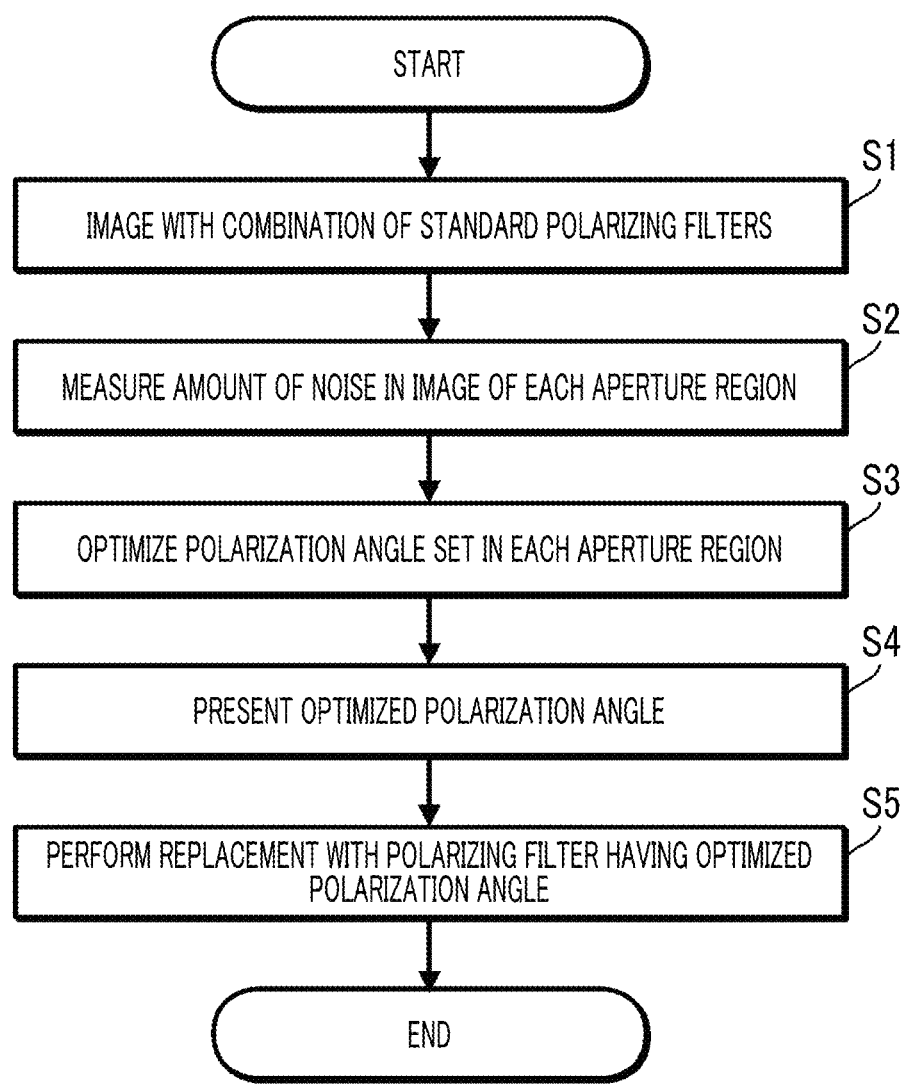
FIG. 28 is a flowchart showing an example of a procedure for optimizing a polarizing filter.

FIG. 28 is a flowchart showing an example of a procedure for optimizing and presenting a polarizing filter.

First, a subject is imaged with a combination of standard polarizing filters (Step S1). For example, a subject is imaged with a combination of polarizing filters at equal intervals. As the bandpass filter, a combination of wavelength ranges actually used is used.

Next, the noise amount of the image in each aperture region (image of each wavelength range) obtained by imaging is measured (Step S2).

Next, the polarization angle set in each aperture region is optimized such that the noise amount of the image in each aperture region is reduced (Step S3). For example, the polarization angle of each aperture region is set such that the number of conditions of the interference matrix is minimized. Further, in a case where the settable polarization angle is limited (for example, in a case where the replaceable polarizing filters are limited), the polarization angle is optimized within the limited range.

Next, the optimized polarization angle is presented (Step S4). For example, it is displayed on the display.

Next, the polarizing filter provided in each aperture region are replaced so as to have the combination of the presented polarization angles (Step S5). The replacement may be performed individually or may be replaced as a whole.

Thereby, it is possible to capture a high-quality multi-spectral image according to the subject and the light source.

[Hardware Configuration of Image Generation Unit]

The hardware structure of the image generation unit is various processors as shown below. The various processors include a central processing unit (CPU) that is a general-purpose processor that functions as various processing units by executing software (program), a programmable logic device (PLD) that is a processor whose circuit configuration can be changed after manufacture, such as field programmable gate array (FPGA), a dedicated electrical circuit that is a processor having a circuit configuration designed exclusively for executing a specific process such as an application specific integrated circuit (ASIC), and the like.

One processing unit may be configured by one of various processors, or may be configured by two or more processors of the same type or different types (for example, a plurality of FPGAs or a combination of a CPU and an FPGA). In addition, a plurality of processing units may be configured by one processor. As an example of configuring a plurality of processing units by one processor, first, as represented by a computer, such as a client or a server, there is a form in which one processor is configured by a combination of one or more CPUs and software and this processor functions as a plurality of processing units. Second, as represented by a system on chip (SoC) or the like, there is a form of using a processor for realizing the function of the entire system including a plurality of processing units with one integrated circuit (IC) chip. Thus, various processing units are configured by using one or more of the above-described various processors as hardware structures.

Furthermore, the hardware structure of these various processors is, more specifically, an electric circuit in which circuit elements such as semiconductor elements are combined.

EXPLANATION OF REFERENCES

1: imaging apparatus
4A: aperture region
10: imaging lens
12: lens
14: aperture plate
14A: first aperture region
14B: second aperture region
14C: third aperture region
15A: first aperture plate
15B: second aperture plate
16A: first bandpass filter
16B: second bandpass filter
16C: third bandpass filter
18A: first polarizing filter
18B: second polarizing filter
18C: third polarizing filter
100: image sensor
110: pixel array layer
112: photodiode
120: polarizing filter element array layer
122A: first polarizing filter element
122B: second polarizing filter element
122C: third polarizing filter element
122D: fourth polarizing filter element
140: micro lens array layer
142: micro lens
200: signal processing unit
200A: analog signal processing unit
200B: image generation unit
200C: coefficient storage unit
D1: image signal
D2: image signal D3: image signal
D4: image signal
L: optical axis
P1: first pixel
P2: second pixel
P3: third pixel
P4: fourth pixel
P5: fifth pixel
P6: sixth pixel
P7: seventh pixel
P8: eighth pixel
P9: ninth pixel
PB (X, Y): pixel block
$\Theta1$: polarization angle of first polarizing filter element
$\Theta2$: polarization angle of second polarizing filter element
$\Theta3$: polarization angle of third polarizing filter element
$\Theta4$: polarization angle of fourth polarizing filter element
$\alpha1$: pixel signal
$\alpha2$: pixel signal
$\alpha3$: pixel signal
$\alpha4$: pixel signal
$\beta1$: pixel signal
$\beta2$: pixel signal
$\beta3$: pixel signal
$\theta1$: polarization angle of first polarizing filter
$\theta2$: polarization angle of second polarizing filter
$\theta3$: polarization angle of third polarizing filter
$\lambda1$: transmission wavelength range of first bandpass filter
$\lambda2$: transmission wavelength range of second bandpass filter
$\lambda3$: transmission wavelength range of third bandpass filter
$\lambda11$: wavelength range of transmission of first bandpass filter
$\lambda12$: wavelength range of transmission of second bandpass filter
$\lambda13$: wavelength range of transmission of third bandpass filter
$\lambda21$: wavelength range of transmission of fourth bandpass filter
$\lambda22$: wavelength range of transmission of fifth bandpass filter
$\lambda23$: wavelength range of transmission of sixth bandpass filter
$\lambda31$: wavelength range of transmission of seventh bandpass filter
$\lambda32$: wavelength range of transmission of eighth bandpass filter
$\lambda33$: wavelength range of transmission of ninth bandpass filter
$\lambda A$: spectral sensitivity of spectral filter element
$\lambda B$: spectral sensitivity of spectral filter element
$\lambda C$: spectral sensitivity of spectral filter element
S1 to S5: procedure for optimizing and presenting polarizing filter

What is claimed is:

1. An imaging apparatus comprising:
an optical system that has three or more aperture regions at a pupil position or near the pupil position, each of the aperture regions being provided with a different combination of a polarizing filter and a bandpass filter such that the aperture region transmits light having a combination of a different polarization angle and a different wavelength range;
an image sensor in which three or more types of pixels that receive light having different polarization angles are arranged two-dimensionally; and
a processor that performs interference removal processing on a signal output from the image sensor and generates an image signal for each of the aperture regions,
wherein, in a case where the optical system has three or more types of the polarizing filters and the polarizing filters are arranged in an order of the polarization angles, at least one of differences in the polarization angles of the adjacent polarizing filters is different from the others, and
the polarization angle of each of the polarizing filters is set based on a sensitivity of the light transmitted through each of the aperture regions, and
the polarization angle set for each of the polarizing filters is set to a polarization angle at which a difference in a noise amount of the image signal in each of the aperture regions is reduced as compared with a case where the differences are all equal.

2. The imaging apparatus according to claim 1, wherein the polarization angle set for each of the polarizing filters is further set to a polarization angle at which a difference in a noise amount of the image signal in each of the aperture regions is minimized.

3. The imaging apparatus according to claim 1, wherein the polarization angle set for each of the polarizing filters is further set to a polarization angle at which an amount of noise amplification due to the interference removal processing is reduced as compared with a case where the differences are all equal.

4. The imaging apparatus according to claim 1, wherein the polarization angle set for each of the polarizing filters is further set to a polarization angle at which an amount of noise amplification due to the interference removal processing is minimized.

5. The imaging apparatus according to claim 1, wherein the polarization angle set for each of the polarizing filters is further set to a polarization angle at which an amount of interference between the image signal in the aperture region having a relatively low sensitivity and the image signal in the other aperture region is reduced.

6. The imaging apparatus according to claim 1, wherein, in a case where the processor performs the interference removal processing based on an interference matrix, the polarization angle set for each of the polarizing filters is further set to a polarization angle at which the number of conditions of the interference matrix is reduced as compared with a case where the differences are all equal.

7. The imaging apparatus according to claim 1, wherein, in a case where the processor performs the interference removal processing based on an interference matrix, the polarization angle set for each of the polarizing filters is further set to a polarization angle at which the number of conditions of the interference matrix is minimized.

8. The imaging apparatus according to claim 1, wherein the optical system has a replacement mechanism in which at least one of the bandpass filter or the polarizing filter is individually replaced.

9. The imaging apparatus according to claim 1, wherein the optical system has a rotational structure in which at least one of the bandpass filter or the polarizing filter rotates.

10. An imaging method comprising:
using an optical system that has three or more aperture regions at a pupil position or near the pupil position, each of the aperture regions being provided with a different combination of a polarizing filter and a bandpass filter such that the aperture region transmits light having a combination of a different polarization angle and a different wavelength range, and an image sensor in which three or more types of pixels that receive light with different polarization angles are arranged two-dimensionally to perform interference removal processing on a signal output from the image sensor and generate an image signal for each of the aperture regions, wherein, in a case where the optical system has three or more types of the polarizing filters and the polarizing filters are arranged in an order of the polarization angles, at least one of differences in the polarization angles of the adjacent polarizing filters is different from the others, and the polarization angle of each of the polarizing filters is set based on a sensitivity of the light transmitted through each of the aperture regions, and the polarization angle set for each of the polarizing filters is set to a polarization angle at which a difference in a noise amount of the image signal in each of the aperture regions is reduced as compared with a case where the differences are all equal.

11. The imaging method according to claim 10, wherein the polarization angle set for each of the polarizing filters is further set to a polarization angle at which a difference in a noise amount of the image signal in each of the aperture regions is minimized.

12. The imaging method according to claim 10, wherein the polarization angle set for each of the polarizing filters is further set to a polarization angle at which an amount of noise amplification due to the interference removal processing is reduced as compared with a case where the differences are all equal.

13. The imaging method according to claim 10, wherein the polarization angle set for each of the polarizing filters is further set to a polarization angle at which an amount of noise amplification due to the interference removal processing is minimized.

14. The imaging method according to claim 10, wherein the polarization angle set for each of the polarizing filters is further set to a polarization angle at which an amount of interference between the image signal in the aperture region having a relatively low sensitivity and the image signal in the other aperture region is reduced.

15. The imaging method according to claim 10, wherein, in a case where the interference removal processing is performed based on an interference matrix, the polarization angle set for each of the polarizing filters is further set to a polarization angle at which the number of conditions of the interference matrix is reduced as compared with a case where the differences are all equal.

16. The imaging method according to claim 10, wherein, in a case where the interference removal processing is performed based on an interference matrix, the polarization angle set for each of the polarizing filters is further set to a polarization angle at which the number of conditions of the interference matrix is minimized.

* * * * *